United States Patent [19]

Matsumoto et al.

[11] Patent Number: 5,666,544
[45] Date of Patent: Sep. 9, 1997

[54] METHOD AND SYSTEM FOR COMMUNICATING DATA BETWEEN INDEPENDENT CONTROLLERS

[75] Inventors: Masashi Matsumoto; Yasushi Saito; Takao Ichihashi; Shuji Yamada, all of Osaka, Japan

[73] Assignee: Mita Industrial Co., Ltd., Osaka-fu, Japan

[21] Appl. No.: 234,776

[22] Filed: Apr. 28, 1994

[30] Foreign Application Priority Data

May 10, 1993 [JP] Japan ................................... 5-108581
May 10, 1993 [JP] Japan ................................... 5-108585

[51] Int. Cl.[6] .................................................. G06F 15/00
[52] U.S. Cl. ............................... 395/800.01; 395/183.1; 395/825; 345/504
[58] Field of Search ........................... 395/800, 200.13, 395/183.1, 504, 526, 200.05, 825

[56] References Cited

U.S. PATENT DOCUMENTS

| | | | |
|---|---|---|---|
| 5,129,093 | 7/1992 | Muramatsu et al. | 395/800 |
| 5,212,724 | 5/1993 | Nazarenko et al. | 379/58 |
| 5,230,043 | 7/1993 | Ichihashi et al. | 395/200 |
| 5,235,595 | 8/1993 | O'Dowd | 370/94.1 |
| 5,537,639 | 7/1996 | Matsumoto et al. | 395/200.13 |

FOREIGN PATENT DOCUMENTS 4-70654  6/1992  Japan.

*Primary Examiner*—Alyssa H. Bowler
*Assistant Examiner*—John Follansbee
*Attorney, Agent, or Firm*—Jordan and Hamburg

[57] ABSTRACT

A system for communicating data between two control units each capable of executing independent operations and having a memory for operations, the system is provided with a new data generator on one control unit. The new data generator generates new data for a selected item of the other control unit. The new data is combined with address data corresponding to the selected item of the memory of the other control unit to generate transmission data. The transmission data is sent to the other control unit and the new item data is written on the memory at the address specified by the transmission data. The data communication system communicates between the two control units data for a first kind of operations and data for a second kind of operations selectively. The first kind data is communicated repeatedly while the second kind data is communicated a single time.

4 Claims, 17 Drawing Sheets

METHOD AND SYSTEM FOR COMMUNICATING DATA BETWEEN INDEPENDENT CONTROLLERS

BACKGROUND OF THE INVENTION

This invention relates to a data communication system which includes a plurality of independent control units, each control unit including a microcomputer so as to control a plurality of independent functional operations and executes a composite functional operation by uniting the plurality of functional operations systematically through the communication among the control units.

In recent years, image forming apparatuses such as digital copying machines have been constructed, in order to avoid the complication and large-size of the apparatus itself resulting from the multiple and high-level imaging function, as system units in which respective functional blocks are treated as independent blocks and the respective blocks are connected systematically so as to execute a composite functional operation as a whole.

In the system unit of this type, there are provided a controller including a microcomputer provided specially for each block and a reloadable storage device such as a RAM random access memory) for storing an information necessary for the controllers to execute the respective functional operations. Further, the respective blocks are connected so that, for example, a serial data communication can be conducted among them to transmit the necessary information to one another. For example, there is known a digital copying machine in which an operation block for controlling output and input of various information concerning a copying operation and a drive block for controlling the actual copying operation based on the information from the operation block are so connected that the communication can be conducted therebetween (Japanese Unexamined Utility Model Publication No. 4-70654).

As a manner for serial data communication, there has been known as a handshaking manner by which the data communication is conducted while each communication end is conforming the receiving state of the other end. There are generally two types of handshaking manner: one by which the handshaking is performed for each independent data, and the other by which a number of data to be transmitted and received is set in advance depending upon a communication mode and the handshaking is performed each time the predetermined number of data are transmitted.

FIG. 17 is a flow chart showing the former conventional handshaking manner.

The description will be given taking the digital copying machine as an example. When a size data A representing the size of a cassette attached to the copying machine is required (YES in Step S200), the controller for the operation block (hereinafter referred to as an operation controller) transmits a transmission requirement data for size data A to the controller for the drive block (hereinafter referred to as a drive controller) (Step S202). Upon the receipt of the transmission requirement data for the size data A (YES in Step S206), the drive controller immediately generates and transmits the size data A to the operation controller (Step S208).

When the operation controller receives the size data A completely (Step S204), the data communication for the size data A is completed. Each time the operation controller requires a certain data, it transmits a transmission requirement data for this data to the drive controller and receives the data therefrom.

FIG. 18 is a flow chart showing the latter conventional handshaking manner.

In a ROM (read only memory) of each of the operation and drive controllers, there is stored a communication mode P for communicating preprogrammed data units DAT1 (A, B ... Y) and DAT2 (a, b ..., y), each including 25 data, alternately. The data units DAT1, DAT2 are constantly transmitted in accordance with the communication mode P.

First of all, the operation controller transmits a code data for the "communication mode P" to the drive controller (Step S210). Upon the receipt of the code data for the "communication mode P" (Step S212), the drive controller sets a state where the communication is enabled in accordance with the communication mode P and transmits a setting completion data of the communication mode P to the operation controller (Step 8214).

Upon the receipt of the setting completion data (Step S216), the operation controller transmits the first data A of the data PAT1 to the drive controller (Step S218). Upon the receipt of the data A (Step S220), the drive controller transmits the first data a of the data PAT2 to the operation controller (Step 8222). Upon the receipt of the data a (Step S224), the operation controller transmits the next data B to the drive controller (Step S226). Upon the receipt of the data B (Step S228), the drive controller transmits the next data b to the operation controller (Step S230).

In this manner, the operation and drive controllers transmit and receive the data DAT1, DAT2 alternately in the specified order. A series of data transmissions is completed when the operation controller receives the last data y from the drive controller (Step S232), and this routine returns to Step S210 in order to conduct the next serial data communication.

Since the communication is conducted while confirming the received state of the other end for each data according to the former conventional handshaking manner, it takes a long time to conduct a data communication for each individual data. When a huge amount of data are transmitted, a processing speed for the data communication is reduced.

More specifically, the more complicated and the higher level the system unit becomes, the more types and the greater amount of data are allowed to be transmitted. Such a data communication requires a long time, thereby reducing considerably the processing efficiency of the respective controllers. For example, in the digital copying machine, 500 to 600 bytes of data are transmitted between the operation and drive blocks. If these data are transmitted in the lump, there is required a communication time of 2.5 to 3 seconds (in 5 ms/byte). During this period, no other control is executable.

Some contents of the data to be transmitted are not always necessary during the data communication. They may be transmitted during a specific period or at specified intervals. For example, between the operation and drive blocks of the digital copying machine are transmitted data necessary for each copying operation such as a copy mode, the number of copies to be made, an exposure level, and a copy start, data necessary to control respective actuators driven to carry out the imaging operation such as a main charger level data, a toner density level data, first/second sheet feeding timing data, and a fixing temperature data, and operation history data such as a total number of developing operations performed, the total number of fed copy sheets, and the number of abnormality. The data necessary for each copying operation need to be transmitted constantly, whereas it is sufficient to transmit the data necessary to control the actuators when the digital copying machine is started unless the control content is not changed, and it is sufficient to transmit the operation history data regularly.

On the other hand, according to the latter conventional handshaking manner, the data are transmitted alternately until the communication of the predetermined number of data is completed. Thus, the communication time is shorter compared to the former manner. However, transmission conditions such as the number of data to be transmitted, contents of data, and the transmission order in the communication mode P are preset and stored in the ROMs of the operation and drive controllers. Accordingly, when the content of the communication mode P needs to be changed, this manner cannot respond to such a request easily.

More specifically, when the content of the communication mode P should be changed, in order to execute an image forming operation more smoothly, such that data units DAT1' (A, B . . . , Y, Z) and DAT2' (a, b . . . , y, z), each containing 26 data, are transmitted alternately, it is necessary to rewrite the contents of the ROMs or to replace the ROMs with new ones. Generally, this cannot be done promptly.

SUMMARY OF THE INVENTION

It is an object of the invention to provide a data communication method and system which have overcome the above-mentioned problems.

It is another object of the invention to provide a data communication method and system which make it possible to transmit necessary data when they are required, and thereby improve the efficiency of the data communication and the control efficiency of the system as a whole.

It is another object of the invention to provide a data communication method and system which make it possible to easily respond to a change in a communication mode such as a change or addition of a communication data without necessitating a change in a basic communication control program.

The invention is directed to a method for communicating data between a first control unit for controlling a first operation and a second control unit for controlling a second operation, the first control unit having a first memory for storing a first operative data necessary to execute its own control independently of the second control unit, the second control unit having a second memory for storing a second operative data necessary to execute its own control independently of the first control unit. The method comprising: generating new data for a selected item of the second operative data; generating transmission data made of the new item data and address data corresponding to the selected item: transmitting the transmission data to the second control unit; and writing the new item data on the second memory at the address specified in the transmission data after receiving the transmission data.

It may be appreciated to generate new data for a selected item of the first operative data; generating transmission data made of the new item data and address data corresponding to the selected item; transmitting the transmission data to the first control unit; and writing the new item data on the first memory at the address specified in the transmission data after receiving the transmission data.

Further, the transmission data may be added with check sum data for checking occurrence of an error in the data transmission, the check sum data being an exclusive OR result of the new item data and the address data.

Also, the invention is directed to a data communication system for communicating data between a first control unit for controlling a first operation and a second control unit for controlling a second operation, the first control unit having a first memory for storing a first operative data necessary to execute its own control independently of the second control unit, the second control unit having a second memory for storing a second operative data necessary to execute its own control independently of the first control unit, the data communication system comprising: address data means provided in the first control unit for storing address data for each of the items constituting the second operative data stored in the second memory; item data generating means provided in the first control unit for generating new data for a selected item of the second operative data; transmission data generating means connected with the address data means and the item data generating means for combining the new item data and the address data corresponding to the selected item to generate transmission data; data transmitting means connected with the transmission data generating means for transmitting the transmission data to the second control unit: data receiving means provided in the second control unit for receiving the transmission data; and writing means connected with the data receiving means for writing the new item data on the second memory at the address specified in the transmission data.

It may be appreciated that the second control unit is further provided with input and out port means having a bit both in direct connection with a bit of a specified address of the second memory and in direct connection with a specified one of a plurality of actuators for executing the second operation.

It may be appreciated that the second control unit is further provided with: address data means for storing address data for each of the items constituting the first operative data stored in the first memory; item data generating means for generating new data for a selected item of the first operative data; transmission data generating means for combining the new item data and the address data corresponding to the selected item to generate transmission data; and data transmitting means for transmitting the transmission data to the first control unit; and the first control unit is further provided with: data receiving means for receiving the transmission data; and writing means for writing the new item data on the first memory at the address specified in the transmission data.

The first control unit may be further provided with input and out port means having a bit in direct connection with both a bit of a specified address of the first memory and a specified one of a plurality of actuators for executing the first operation.

One or the both of the first and second control units may be further provided with check sum data generating means for generating check sum data for checking occurrence of an error in the transmission, the check sum data being an exclusive OR result of the new item data and the address data, to generate transmission data made of the new item data, the address data, and the check sum data.

It may be appreciated that the first and second control units are provided in an image forming apparatus, the first control unit is adapted for controlling an input and out operation of information necessary for image forming, and the second control unit is adapted for controlling an operation of reading a document image and forming an image on a copy item.

Further, the invention is directed to a data communication system for communicating data between first and second control units for controlling a plurality of operations independently of each other, the data communication system comprising: first communication means provided in each of the first and second control units for communicating data for a first kind of operations between the first and second control units; second communication means provided in each of the first and second control units for communicating data for a second kind of operations between the first and second control units; and change means provided in each of the first and second control units for changing from the first communication means to the second communication means, and vice versa.

The first communication means may execute communication of the first data repeatedly within a predetermined time. The second communication means may execute communication of the second data a single time within a predetermined time.

It may be appreciated that the change means changes from the first communication means to the second communication means each period of a specified time. Also, it may be appreciated that the change means changes from the first communication means to the second communication means after a specified operation of the first kind of operations is completed.

It may be appreciated that the data for the second kind of operations is data in connection with the execution of the first kind of operations. It may be appreciated that the data for the first kind of operations are changed more frequently than the data for the second kind of operations.

It may be appreciated that the first and second control units are provided in an image forming apparatus, the first control unit is adapted for controlling an input and out operation of information necessary for image forming, and the second control unit is adapted for controlling an operation of reading a document image and forming an image on a copy item.

The second control unit may be further provided with means for generating data in connection with a history of the reading and forming operation to communicate the operation history data between the first and second control units.

According to the invention, new data for a selected item of the second operative data is generated in the first control unit, transmitted to the second control unit with address data corresponding to the selected item, and written on the second memory at the address specified in the transmission data. Accordingly, a portion of the memory of the second control unit can be changed from the first control unit side.

Additionally, new data for a selected item of the first operative data is generated in the second control unit, transmitted to the first control unit, and written on the first memory at the specified address. Accordingly, a portion of the memory of the first control unit can be further changed from the second control unit side.

Also, the second control unit is further provided with input and out port means having a bit both in direct connection with a bit of a specified address of the second memory and in direct connection with a specified one of a plurality of actuators for executing the second operation. Accordingly, a portion of actuators connected with the second control unit can be controlled directly from the first control unit.

Further, according to the invention, data to be communicated between the first and second control units are divided into two groups, i.e., data for a first kind of operations and data for a second kind of operations. The first kind of data is repeatedly while the second kind of data is transmitted a single time. The kinds of data are selectively placed in communication between the first and second control units. Accordingly, this makes it possible to transmit frequently-used data for a longer time or usual time while to transmit less frequently-used data for a shorter time or an interrupted time, which improve the transmission efficiency.

The above and other objects, features and advantages of the present invention will become more apparent upon a reading of the following detailed description and drawings.

DETAILED DESCRIPTION OF THE PREFERRED EMBODIMENTS OF THE INVENTION

A data communication system according to the invention will be described, taking a digital image forming apparatus as an example.

Figure 1:
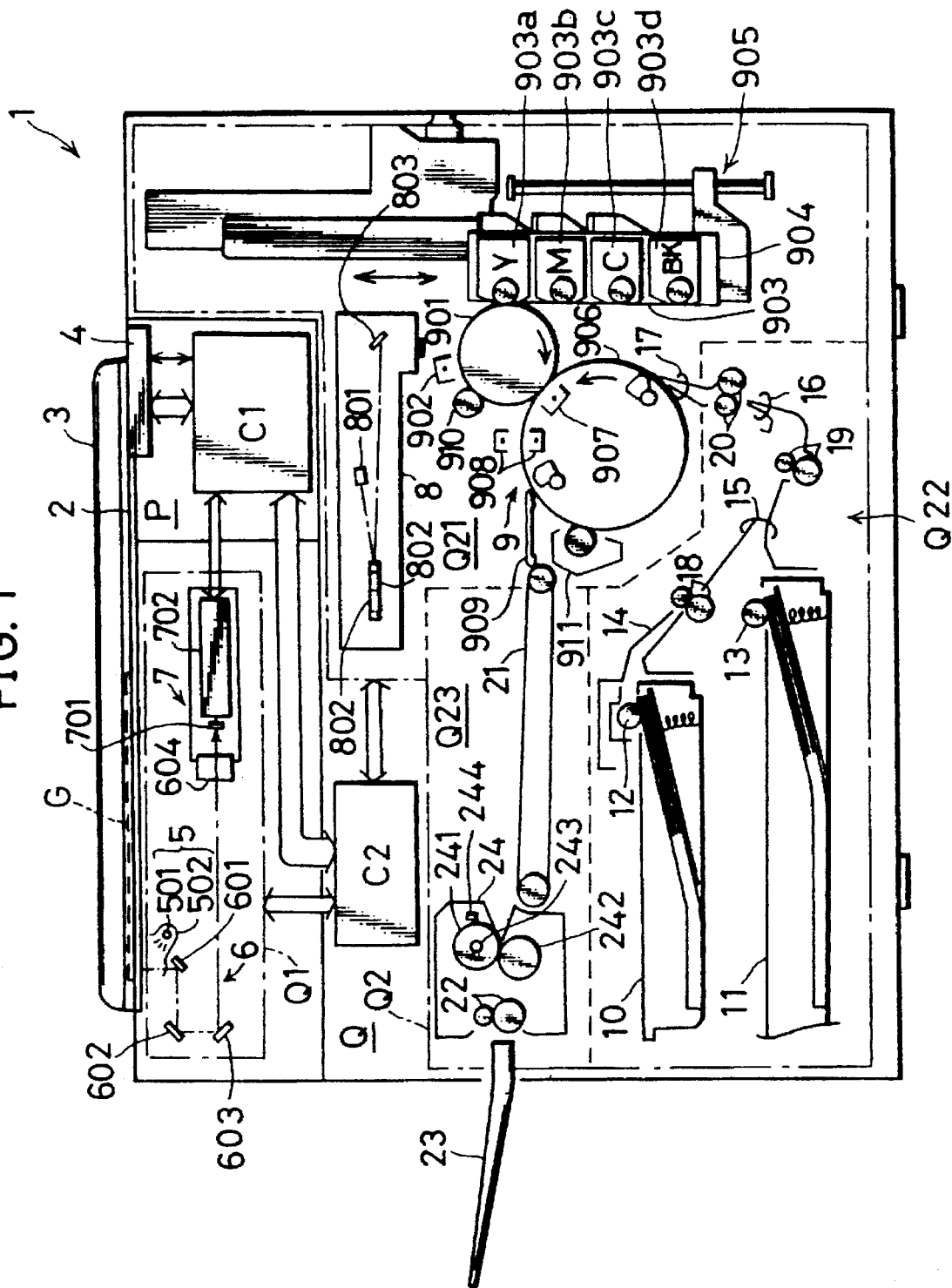
FIG. 1 is a schematic diagram showing a construction of a color digital copying machine using a data communication system of the invention.

FIG. 1 is a schematic construction diagram showing a color digital copying machine (digital image forming apparatus) 1 as an embodiment of the invention.

The copying machine 1 is provided with a transparent document platen 2, a document holder 3 and an operation panel 4 at an upper portion thereof, and an imaging mechanism including an operation control block P and a drive control block Q inside a main body thereof. Cassettes 10, 11 are detachably attachable to a lower left part of the interior of the main body.

The operation control block P and the drive control block Q are mutually independent function blocks, and their functional operations are controlled by an operation controller C1 and a drive controller C2, each including a microcomputer, provided in the respective blocks. The controllers C1, C2 are connected with each other so as to conduct a serial data communication therebetween, and fulfills a composite functional operation; a document is copied by uniting the operation control block P and the drive control block Q systematically through the communication of an information necessary at each end.

The operation control block P controls input and output of an information necessary for a copying operation in the operation panel 4 and controls the serial data communication with the drive control block Q.

Figure 4:
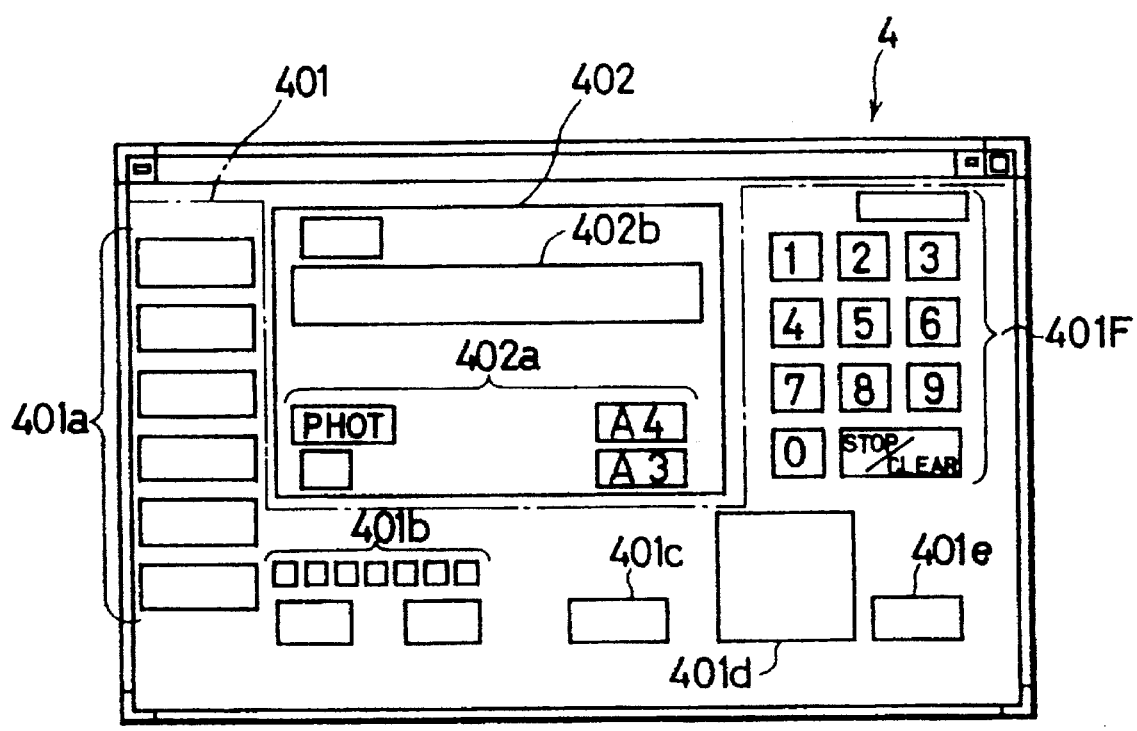
FIG. 4 is a plan view showing details of an operation panel.

FIG. 4 is a plan view showing the details of the operation panel 4.

The operation panel 4 is provided with a key unit 401 including keys which are operated to input various imaging conditions, and a LCD unit 402 including a LCD (liquid crystal display) for displaying various messages and copying conditions.

The key unit 401 includes a mode setting key 401a for setting various copy modes, an exposure key 401b for setting an exposure level, a cassette key 401c for selecting the size of a copy sheet, a copy key 401d for designating a copying operation, a reset key 401e for resetting an inputted condition, a key arrangement 401f for setting and resetting the number of copies to be made and the like.

The LCD unit 402 includes a fixed information display section 402a for displaying a fixed information such as the size of the copy sheet and a message display section 402b for displaying a suitable message as a character information according to an operated state of the copying machine.

Referring back to FIG. 1, the drive control block Q includes an image reader Q1 for reading an image information of a document G placed at a specified position on the document platen 2 and an imaging assembly G2 for forming an image of the document G on a copy sheet using the image information read by the image reader Q1. The image reader Q1 is provided below the document platen 2 and the imaging assembly Q2 is provided below the image reader Q1.

The image reader Q1 is provided with a light source unit 5 for emitting a light onto the document G, a focusing unit 6 for introducing a light image of the document G to an image pick-up unit 7, and the unit 7 for reading the received light image by converting it photoelectrically into an image signal. The light source unit 5 includes a halogen lamp 501 and a reflecting plate 502. The focusing device 6 includes reflection mirrors 601, 602, 603 and a lens 604. The image pick-up unit 7 includes a solid state image pick-up device 701 having, for example, a CCD image sensor (hereinafter referred to as a CCD 701) and an image processor 702 for applying a specified image processing to the image signal read by the CCD 701.

The CCD 701 is, for example, a line sensor including a three CCD image sensors, each having color filters of red (R), green (G) and blue (B); separates the read image signal into color image signals of R, G, B; and outputs the same. The image processor 702 includes a page memory having a capacity of storing 4 pages. The image processor 702 converts the respective color image signals of R, G, B read by the CCD 701 into color image signals of cyan (C), yellow (Y), magenta (M) and black (BK) and stores thus generated signals in the page memory.

When the reading of the document image is designated by the drive controller C2, the image reader Q1 illuminates the document G by causing the halogen lamp 501 to emit a light and causes the light source unit 5 and the focusing unit 6 to move in a sub-scanning direction (a transverse direction in FIG. 1) to read the image of the document G.

More specifically, the light emitted from the halogen lamp 501 is reflected by the document G and introduced through the reflection mirrors 601 to 603 to the image pick-up unit 7, in which the reflected light is gathered as much as possible and directed to a sensing surface of the CCD 701 through the lens 604. The light image of the document G is formed on the sensing surface of the CCD 701 by moving the light source unit 5 and the focusing unit 6 in the sub-scanning direction, and thus formed light image is converted photoelectrically into an image signal by the CCD 701. The image signal is read in and out of the CCD 701 controllably in synchronism with the scanning of the light source unit 5 and the focusing unit 6. The image signal representing the image of the document G is read by the line.

The imaging assembly Q2 is provided with an imaging unit Q21 for forming the image of the document G on a copy sheet, a feeding unit Q22 for feeding copy sheets from cassettes 10, 11 to the imaging unit Q21, and a discharge unit Q23 for discharging the copy sheet bearing the image.

The imaging unit Q21 includes an image data output device 8 for outputting the image data and an imaging device 9 for forming and transferring the image to the copy sheet based on the image data outputted from the output device 8.

The output device 8 includes a laser emitter 801 for emitting a laser beam modulated with the image data, a polygonal mirror 802, and a reflection mirror 803. The polygonal mirror 802 directs the laser beam emitted from the laser emitter 801 in a main scanning direction, so that the laser beam scans the circumferential surface of a photosensitive drum 901 in a direction parallel with a shaft of the drum 901. The reflection mirror 803 introduces the laser beam to an exposure position of the drum 901.

The imaging device 9 includes the photosensitive drum 901, a main charger 902, a developing device 903, and a transfer drum 906. A toner image of the document G to be transferred to the copy sheet is formed on the drum 901 based on the image data. The charger 902 charges the surface of the drum 901 to have a specified surface potential, so that a latent image of the document G can be formed thereon. The developing device 903 develops the latent image formed on the drum 901 into a toner image. The transfer drum 906 transports the copy sheet to the drum 901 so that the toner image of the document G can be transferred thereto.

A transfer device 907 is provided inside the transfer drum 906 at a position opposed to the photosensitive drum 901. Separating devices 908 for separating the copy sheet from the drum 901 after the image is transferred to the copy sheet are provided inside and outside the drum 906 and downstream from the transfer device 907. Downstream from the separating devices 908 is provided a separating claw 909. Indicated at 910, 911 are cleaners for cleaning the toner remaining on the drums 901, 906, respectively.

The developing device 903 includes four containers 903a, 903b, 903c, 903d arranged vertically. The respective containers 903a to 903d contain four different color developing agents of yellow (Y), magenta (M), cyan (C) and black (BK) in this order from the uppermost one. These containers 903a to 903d are arranged in a frame 904 movable upward and downward through an elevating mechanism 905, and are brought to the position opposed to the photosensitive drum 901 one after another according to the elevating movement of the frame 904.

The transfer drum 906 is driven by, for example, a gear mechanism (not shown) so as to rotate together with the photosensitive drum 901 at the same speed as and in the opposition direction from the drum 901. The drum 906 feeds the copy sheet fed from the feeding unit Q22 while attracting the same electrostatically at its circumferential surface and causes the toner image formed on the drum 901 to be transferred to the copy sheet.

The feeding unit Q22 includes feed rollers disposed respectively at upper leading positions of the cassettes 10, 11, guide plates 14, 15, 16, 17 for guiding the copy sheets from the cassettes 10, 11 to the transfer drum 906, pairs of transport rollers 18, 19 disposed at desirable intermediate positions of the guide plates 14 to 17, and a pair of registration rollers 20.

The cassettes 10, 11 have each, for example, a magnetic code indicative of a cassette size (i.e., sheet size) at a specified position. When these cassettes are attached to the copying machine, the coded information is read into the drive controller C2.

The discharge unit Q23 includes a transport belt 21, a pair of discharge rollers 22, and a discharge tray 23. Between the transport belt 21 and the discharge roller pair 22, there is provided a fixing device 24 for fixing the transferred document image to the copy sheet. The fixing device 24 includes a heating roller 241 and a pressing roller 242. A fixing heater 243 and a temperature sensor 244 are provided at suitable positions in the heating roller 241. The sensor 244 detects the temperature at the circumferential surface of the heating roller 241.

Here, the copying operation will be described. The photosensitive drum 901 is drivingly rotated at a specified speed. After being charged by the main charger 902 to have a specified surface potential, the charged surface of the drum 901 is brought to a position at which the laser beam is directed. The laser beam raster-scans relatively the drum surface according to the rotation of the drum 901 and the surface potential of the drum 901 changes according to the illuminance of the laser beam, thereby forming a latent image of the document G on the drum surface.

Charged toner supplied from the developing device 903 is attracted electrostatically to this latent image, thereby forming a toner image, which is brought into pressing contact with and transferred to the copy sheet transferred by the transfer drum 906.

The above imaging operation is repeated four times for the image data of the respective colors of Y, M, C, BK. Upon the completion of the imaging operation for the image data of BK, the copy sheet attracted electrostatically on the circumferential surface of the transfer roller 906 is separated from the drum 906 by the separating devices 908 and the separating claw 909. The copy sheet is transferred by the transport belt 21 to the fixing device 24, in which the toner image is fixed to the copy sheet. Consequently, the copy sheet is discharged onto the discharge tray 23 by the discharge roller pair 22.

The operation of reading the image data and that of forming the image of the document G are controlled centrally by the drive controller C2.

Figure 2:
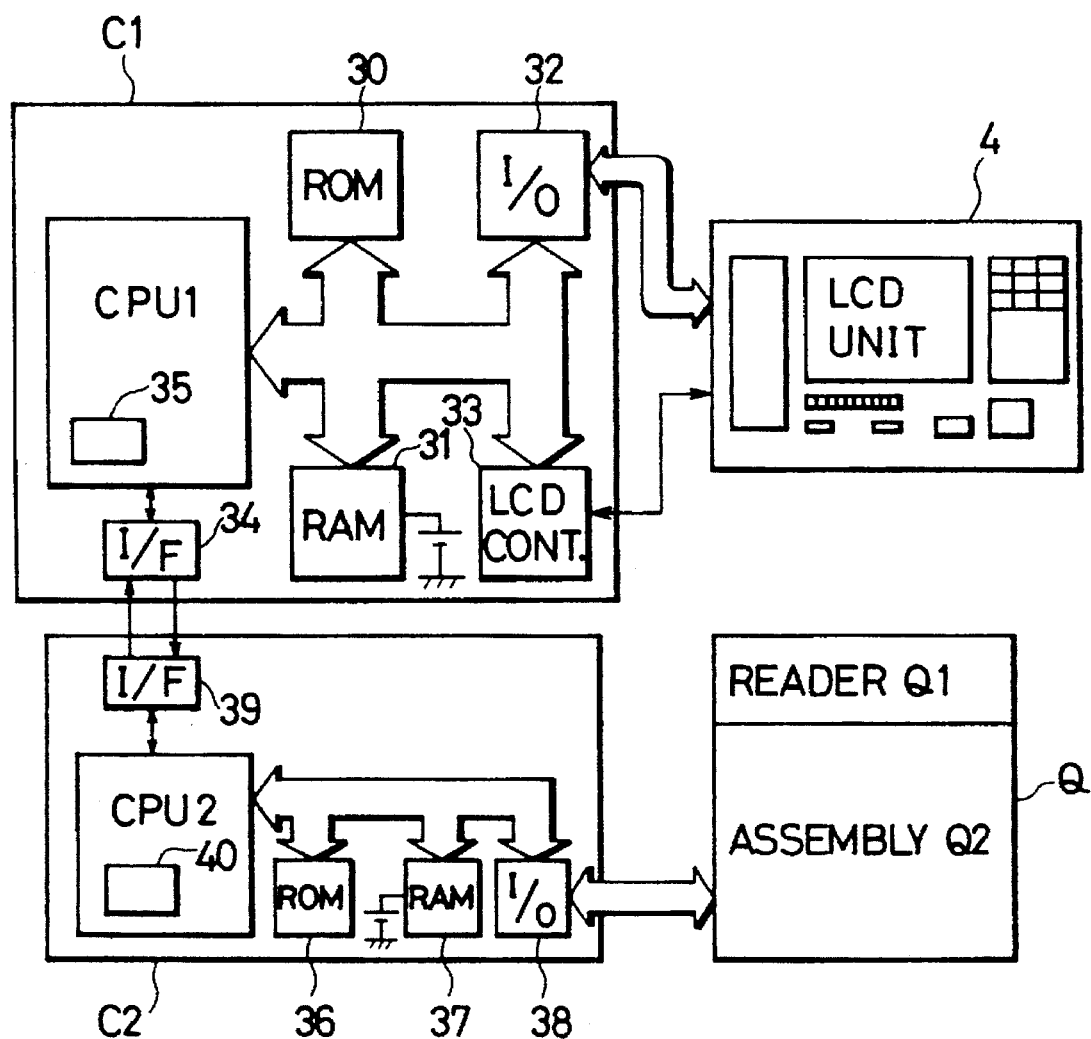
FIG. 2 is a diagram showing a basic construction of an operation controller and a drive controller of the color digital copying machine.

FIG. 2 is a diagram showing a basic construction of the operation and drive controllers C1, C2.

The operation controller C1 is basically provided with a central processing unit (hereinafter referred to as a CPU 1) for controlling the operation of the operation control block P, a ROM 30, a RAM 31, an input/output port (I/O port), a LCD controller 33, and an interface (I/F) 34. In the ROM 30 are prestored control programs specifying a procedure of an operation control executed in the operation control block P, a procedure of the communication with the drive control block Q, and the like. The RAM 31 stores the information necessary for the CPU 1 to execute specified processings in accordance with the control program and operation results. The I/O port 32 is adapted to output and input the desired data to and from the operation panel 4. The LCD controller 38 controls the drive of the LCD unit 402 in the operation panel 4. The I/F 34 is adapted to conduct a serial data communication with a central processing unit (CPU 2) provided in the drive controller C2.

Figure 3:
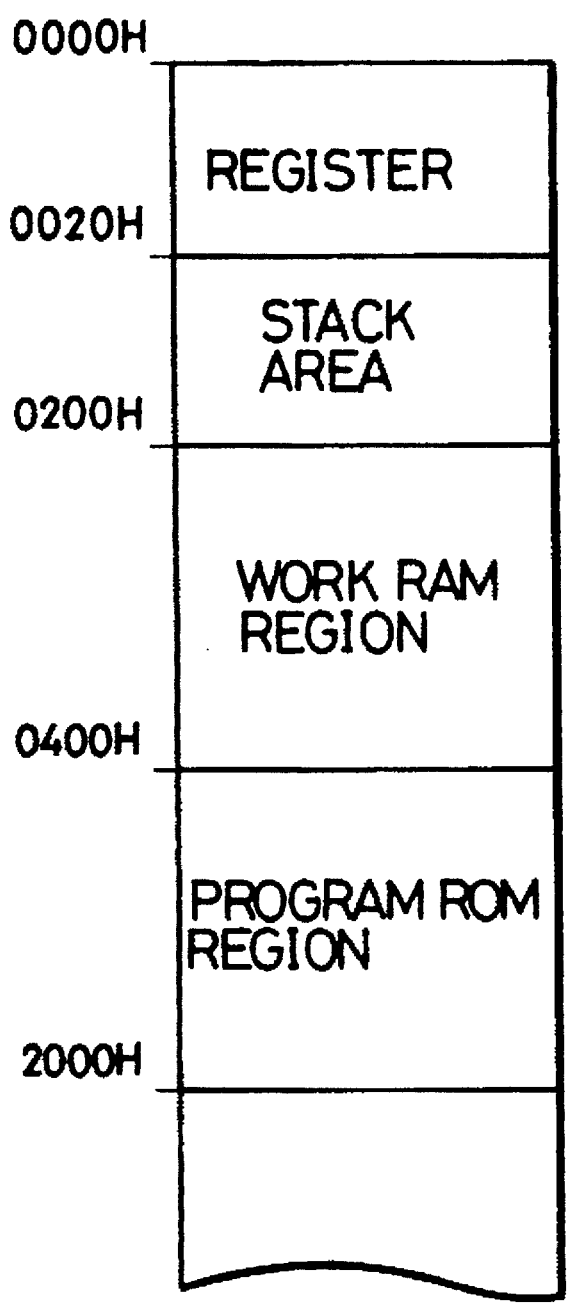
FIG. 3 is a diagram showing a construction of a virtual memory space when a central processing unit executes an operation.

The CPU 1 is provided internally with a RAM 35 used for the processing (hereinafter referred to as an internal RAM 35). The CPU 1 reads the necessary programs and data from the ROM 30 and the RAM 31 according to the content of the processing and develops them in the internal RAM 35. For example, the CPU 1 executes a specified processing in a virtual memory space shown in FIG. 3, and sends the processing result to the operation panel 4 through the LCD controller 33 and the I/O port 32, or transmits the processing result to the drive controller C2 through the I/F 34 in accordance with a communication mode to be described later.

Similar to the operation controller C1, the drive controller C2 is provided with the CPU 2 for controlling the operation of the drive control block Q, a ROM 36, a RAM 37, an I/O port 38, and an I/F 39. In the ROM 36 are prestored control programs specifying a procedure of an operation control executed in the drive control block Q, a procedure of the communication with the operation control block P, and the like. The RAM 37 stores the information necessary for the CPU 2 to executes specified processings in accordance with the control program and operation results. The I/O port 38 is adapted to output and input the desired data to and from the imaging assembly Q2 and the image reader Q1. The I/F 39 is adapted to conduct a serial data communication with the CPU 1.

The CPU 2 includes an internal RAM 40 as well. After executing a specified processing according to the manner similar to the CPU 1, the CPU 2 outputs the processing result to the image reader Q1 and the imaging assembly Q2 through the I/O port 38, or transmits the same to the operation controller C1 through the I/F 39.

The serial data communication is conducted in accordance with a transmission program, a reception program, and a communication control program including a communication data table. These programs are stored in the ROMs 30, 36. The transmission program consists of control programs including a transmission control, a transmission interrupt control, and the setting of an information to be transmitted during the communication (hereinafter referred to as a communication data). The reception program consists of control programs including a reception interrupt control, a reception error check, and a connection check.

The communication data table consists of a data table for various data transmitted through the serial data communication (hereinafter referred to as a transmission data) and an address data table for an address in a RAM region at the receiving end at which the transmission data is set (hereinafter referred to as a receiving end storage address table).

TABLE-1 below shows an example set of data transmitted between the operation and drive controllers C1, C2.

Magnification Data: a data concerning a copying magnification in a size enlargement or reduction copying.

Communication Mode Recognition Data: a data used to confirm the communication mode.

State Flag: a flag representing various states in the drive control block Q such as the fixing temperature, copying operation performed, toner being replenished, absence of copy sheet.

Cassette Size Data: a data representing the size of copy sheets contained in the set cassette.

Environment Data: a data representing the environment of the drive control block Q such as the temperature and humidity.

Fed Sheet Number Data: a data representing the number of copy sheets fed during the copying operation.

Discharged Sheet Number Data: a data representing the number of copy sheets discharged during the copying operation.

TABLE 1

CONTENTS OF COMMUNICATION DATA

| (A) OPER. CONT. → DRIVE CONT. | (B) DRIVE CONT. → OPER. CONT. |
|---|---|
| [NORMAL COMM. DATA] | [NORMAL COMM. DATA] |
| ① COMM. MODE DATA | ① COMM. MODE RECOG. DATA |
| ② CONT. FLAG A | ② STATE FLAG |
| ③ CONT. FLAG B | ③ CASSETTE SIZE DATA |
| ④ COPY MODE FLAG | ④ ENVIRONMENT DATA |
| ⑤ SELECTED CASSETTE INFO. | ⑤ FEED SHEET NO. DATA |
| ⑥ MAGNIFICATION DATA | ⑥ DISCHARGED SHEET NO. DATA |
| [SIMULATION DATA] | [HISTORY DATA] |
| ① TONER CONTROL DATA | ① TOTAL DEVELOPMENT NO. DATA |
| ② DEVE. CORRECTION DATA | ② STARTING AGENT REPLACEMENT NO. DATA |
| ③ MAIN CHARGER CONT. DATA | ③ TONER EMPTY NO. DATA |
| ④ MAIN CHARGER CORRE. DATA | ④ UPPER CASSE. FEED NO. DATA |
| ⑤ 1ST FEED TIMING DATA | ⑤ LOWER CASSE. FEED NO. DATA |
| ⑥ 2ND FEED TIMING DATA | ⑥ TOTAL COUNT DATA |
| ⑦ FIXING TEMP. CONT. DATA | ⑦ DEVE. AGING TIME DATA |
| ⑧ LAMP CONT. DATA | |
| [OPER. CONT. BACK-UP DATA] | |
| ① OPER. CONT. SIMU. DATA | |
| ② ABNORM. DETECTION NO. DATA | |
| ③ SET FUNCTION NO. DATA | |

In TABLE-1, indicated at (A) are data transmitted from the operation controller C1 to the drive controller C2, and at (B) data transmitted from the drive controller C2 to the operation controller C1.

The normal communication data are used mainly to set a present state of the copying operation and are transmitted between the operation controller C1 and the drive controller C2 constantly while the color digital copying machine 1 operates.

Contents of the respective normal communication data are as follows.

Communication Mode Data : a data representing a communication mode

Control Flags A, B: various control flag data necessary to control the copying operation, such as a copying operation requirement, a copying operation stop requirement, a counter drive prohibition requirement, a fixing heater turn-on prohibition requirement.

Copy Mode Flag: various flag data concerning a copy mode such as a color copy, duplex copy, a page continuous copy.

Selected Cassette Information: information on a cassette selected in a manual mode or auto-mode.

The simulation data are data representing the driving timings and control reference values of various actuators provided in the image reader Q1 and the imaging assembly Q2. These data are adjusted and set by simulating the driving of the color digital copying machine 1. The simulation data are normally determined by carrying out a simulation when the color digital copying machine 1 is manufactured or when a maintenance is made, and are transmitted from the operation controller C1 to the drive controller C2 upon the completion of the simulation.

The simulation data are backed up by the RAM 31 in the operation controller C1. When an abnormality occurs in the RAM 31, the simulation data stored in the RAM 37 of the drive controller C1 are transmitted to the operation controller C1 in order to restore the back-up data in the RAM 31.

The history data includes various data which represent an operation history of the drive control block Q and are used for a regular inspection and repair of the color digital copying machine 1. The history data are transmitted from the drive controller C2 to the operation controller C1, for example, upon the completion of the copying operation or upon each lapse of a predetermined period.

The operation control back-up data are used to back up the data required in the operation controller C1 in the drive controller C2. The operation controller simulation data may be, for example, a secret code or a tablet correction value, and are set by carrying out the simulation. Similar to the simulation data, the operation controller simulation data are also transmitted from the operation controller C1 to the drive controller C2 upon the completion of the simulation, and are transmitted from the drive controller C2 to the operation controller C1 in the event of an abnormality in the RAM 31.

The abnormality detection number data is a count data representing the number of detected abnormality occurred in the drive control black Q, and is used to confirm the state and the performance of the color digital copying machine 1. The operation controller C1 counts the number of detected abnormality based on the state flag transmitted from the drive controller C2 and generates the abnormality detection number data. When an abnormality is detected, the operation controller C1 transmits this abnormality detection number data to the drive controller C2.

The set function number data represents the number of various functions set during the copying operation such as a duplex copy and a page continuous copy, and is used to confirm the used state of the color digital copying machine 1. The set function number data is transmitted from the operation controller C1 to the drive controller C2 upon the completion of the copying operation.

The data representing the history such as the history data, the abnormality detection number data and the set function number data may be transmitted by interrupting the communication of the normal communication data. For instance, every time the normal communication data are transmitted a specified number of times, the communication mode is switched from the normal communication mode to the transmission mode for the history data and the like, thereby allowing the history data and the like to be interruptingly transmitted. Upon the completion of the communication of these data, the communication mode is switched to the normal communication mode to transmit the normal communication data.

The normal communication data, the simulation data, the history data, and the operation control back-up data have mutually different communication conditions, such as a communication manner (bidirectional communication/ unidirectional communication), the number of data to be transmitted, and the communication time. Accordingly, the communication is conducted in the specified communication mode according to the type of the data. The control program for each communication mode is stored in the ROMs 30, 36.

TABLE-2 below shows the type and contents of the communication mode.

TABLE 2

| MODE NO. | TYPE | CONTENTS |
| --- | --- | --- |
| 0 | NORMAL COMMUNICATION | NORMAL COMMUNICATION DATA ARE TRANSMITTED BETWEEN THE OPERATION CONTROLLER AND THE DRIVE CONTROLLER |
| 1 | SIMULATION DATA TRANSMISSION MODE A | SIMULATION DATA ARE TRANSMITTED FROM THE OPERATION CONTROLLER TO THE DRIVE CONTROLLER |
| 2 | SIMULATION DATA TRANSMISSION MODE B | SIMULATION DATA ARE TRANSMITTED FROM THE DRIVE CONTROLLER TO THE OPERATION CONTROLLER |
| 3 | HISTORY DATA TRANSMISSION MODE A | HISTORY DATA ARE TRANSMITTED FROM THE OPERATION CONTROLLER TO THE DRIVE CONTROLLER |
| 4 | HISTORY DATA TRANSMISSION MODE B | HISTORY DATA ARE TRANSMITTED FROM THE DRIVE CONTROLLER TO THE OPERATION CONTROLLER |
| 5 | OPERATION SIMULATION DATA TRANSMISSION MODE | OPERATION CONTROLLER SIMULATION DATA ARE TRANSMITTED FROM THE OPERATION CONTROLLER TO THE DRIVE CONTROLLER |
| 6 | ABNORMALITY DETECTION NO. DATA TRANSMISSION MODE | ABNORMALITY DETECTION NO. DATA ARE TRANSMITTED FROM THE OPERATION CONTROLLER TO THE DRIVE CONTROLLER |
| 7 | SET FUNCTION NO. DATA TRANSMISSION MODE | SET FUNCTION NO. DATA ARE TRANSMITTED FROM THE OPERATION CONTROLLER TO THE DRIVE CONTROLLER |
| 8 | OPERATION CONTROL BACK-UP DATA TRANSMISSION MODE | OPERATION CONTROLLER SIMULATION DATA, ABNORMALITY DETECTION NO. DATA, SET FUNCTION NO. DATA ARE TRANSMITTED FROM THE DRIVE CONTROLLER TO THE OPERATION CONTROLLER |

The normal communication mode is a communication mode for communicating the normal communication data. When the color digital copying machine 1 is started, the normal communication mode is set as a communication mode and the operation and drive controllers C1, C2 transmit the normal communication data to each other repeatedly unless the data communication in the other communication mode is required.

In the normal communication mode, as shown in TABLE-1, the communication mode data, the control flag data A, the control flag data B, the copy mode flag, the selected cassette information, and the magnification data are transmitted from the operation controller C1 to the drive controller C2.

Further, the communication mode recognition data, the state flag, the cassette size data, the environment data, the fed sheet number data and the discharged sheet number data are transmitted from the drive controller C2 to the operation controller C1. These normal communication data are transmitted alternately between the controllers C1, C2.

Figure 5:
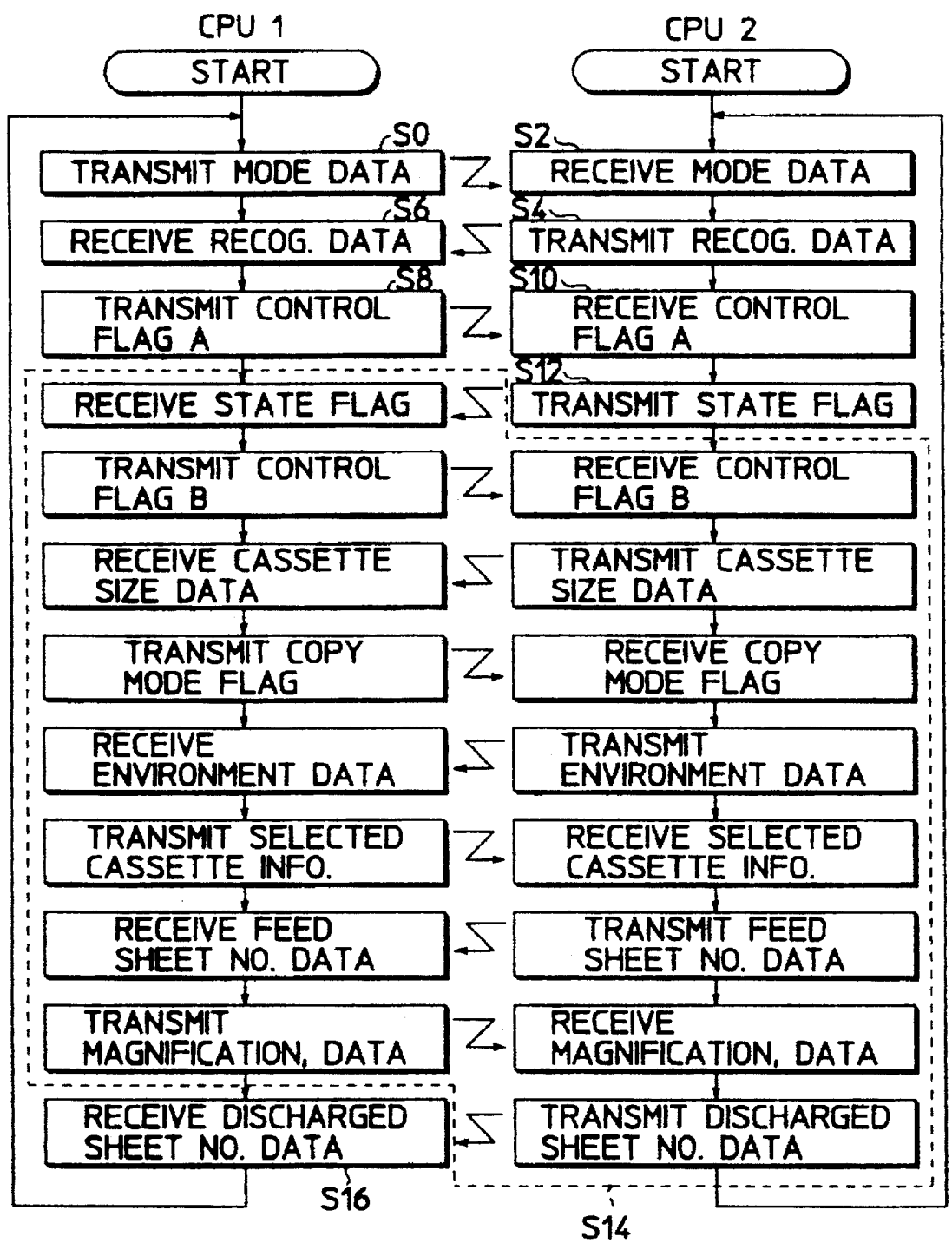
FIG. 5 is a flow chart showing a data communication conducted in a normal communication mode.

More specifically, as shown in FIG. 5, the operation controller C1 transmits the communication mode data (Step S0). The communication mode data is, for example, the mode number in TABLE-2 and is "0" in the normal communication mode. Upon the receipt of the communication mode data "0" (Step S2), the drive controller C2 sets the communication mode to the one represented by the communication mode data, and transmits the communication mode data (="0") representing the set communication mode as a communication mode recognition data to the operation controller (Step S4).

The operation controller C1 confirms the completion of the preparation for the communication conducted in the normal communication mode based on the received communication mode recognition data (Step S6), and transmits the data representing the control flag A to the drive controller C2 (Step S8). More specifically, the operation controller C1 checks whether the received communication mode recognition data coincides with the transmitted communication mode, thereby confirming whether the communication mode is ready. When receiving the communication mode recognition data "0", the operation controller C1 judges that the preparation for communication conducted in the normal communication mode is completed and transmits the normal communication data.

Upon the receipt of the data representing the control flag A (Step S10), the drive controller C2 transmits the data representing the state flag to the operation controller (Step S12). Thereafter, the operation controller C1 and the drive controller C2 transmit to each other the control flag B, ..., the cassette size data ..., the magnification data and the discharged sheet number data alternately in this order (Step S14). Upon the receipt of the discharged sheet number data (Step S16), the operation controller C1 judges that the communication for the normal communication data has been completed and returns to Step S0 in order to conduct the communication for the normal communication data again.

The data are transmitted unidirectionally in the communication modes other than the normal communication mode. In each of these unidirectional communication mode, the number of data to be transmitted, the contents of the data, and the transmitting order of the data are preset in the control program. Accordingly, the transmitting end transmits a fixed number of data unidirectionally to the receiving end in accordance with the specified control program, and the receiving end receives the transmitted data in accordance with the specified control program.

Figure 6:
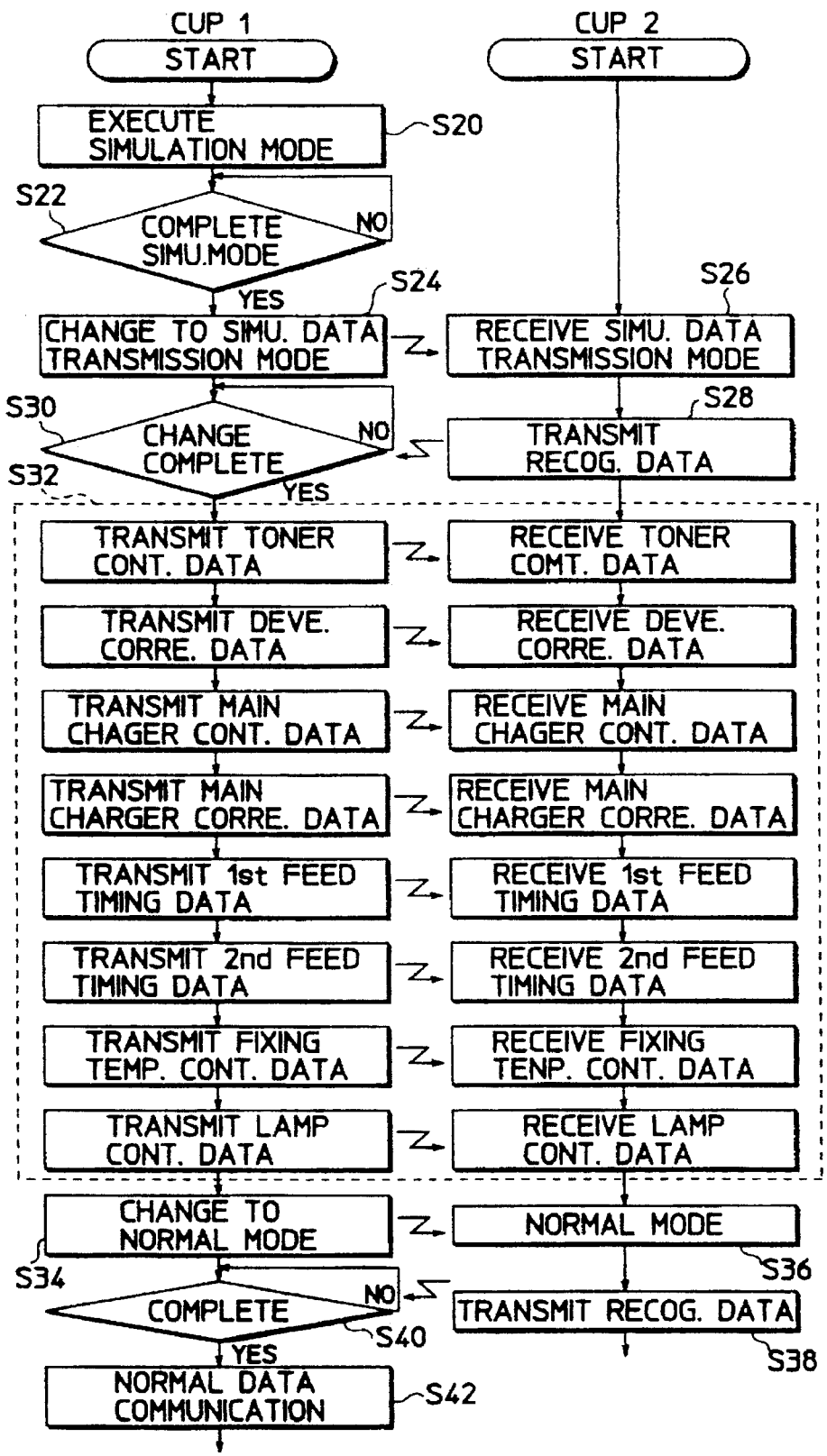
FIG. 6 is a flow chart showing a data communication conducted in a simulation transmission mode A.

FIG. 6 is a flow chart showing the data communication conducted in the simulation data transmission mode A.

When a code for the simulation mode is inputted through the operation panel 4, the CPU 1 reads the control program for the simulation mode stored in the ROM 30 and sets the same in the internal RAM 35 so as to execute a specified simulation in accordance with this control program (Step S20).

Upon the completion of the processing in the simulation mode (YES in Step S22), the CPU 1 changes the communication mode to the simulation data transmission mode A so as to transmit various data set by the simulation (simulation data) to the drive controller C2 and the communication mode data "1" representing the simulation data transmission mode A to the CPU 2 (Step S24).

Upon the receipt of the communication mode data (Step S26), the CPU 2 changes the communication mode from the normal communication mode to the simulation data transmission mode A and transmits to the CPU 1 the data representing the set communication mode as a communication mode recognition data (Step S28). The CPU 1 judges based on the received communication mode recognition data and the transmitted communication mode data whether the preparation for the simulation data transmission mode A has been completed (Step S30). If this preparation has been completed (YES in Step S30), the CPU 1 transmits the simulation data (Step S32).

More specifically, when the communication mode recognition data received from the CPU 2 coincides with the transmitted communication mode (YES in Step S30), the CPU 1 judged that the preparation for the simulation data transmission mode A has been completed and transmits to the CPU 2 the toner control data, the development correction data, the main charger control data, the first feed timing data, the second feed timing data, the fixing temperature control data, and the lamp control data in this order. The CPU 2 receives the respective data in this order (Step S32).

Upon the completion of the transmission of the lamp control data, the CPU 1 transmits the communication mode data "0" to the CPU 2 in order to change the communication mode to the normal communication mode (Step S34).

After receiving the simulation data one by one and then the communication mode data "0" (Step S36), the CPU 2 changes the communication mode from the simulation data transmission mode A to the normal communication mode and transmits the communication mode recognition data "0" to the CPU 1 (Step S38).

Upon the receipt of the communication mode recognition data "0" (YES in Step S40), the CPU 1 judges that the communication mode is returned to the normal communication mode and thereafter the data communication is conducted in the normal communication mode (Step S42).

Figure 7:
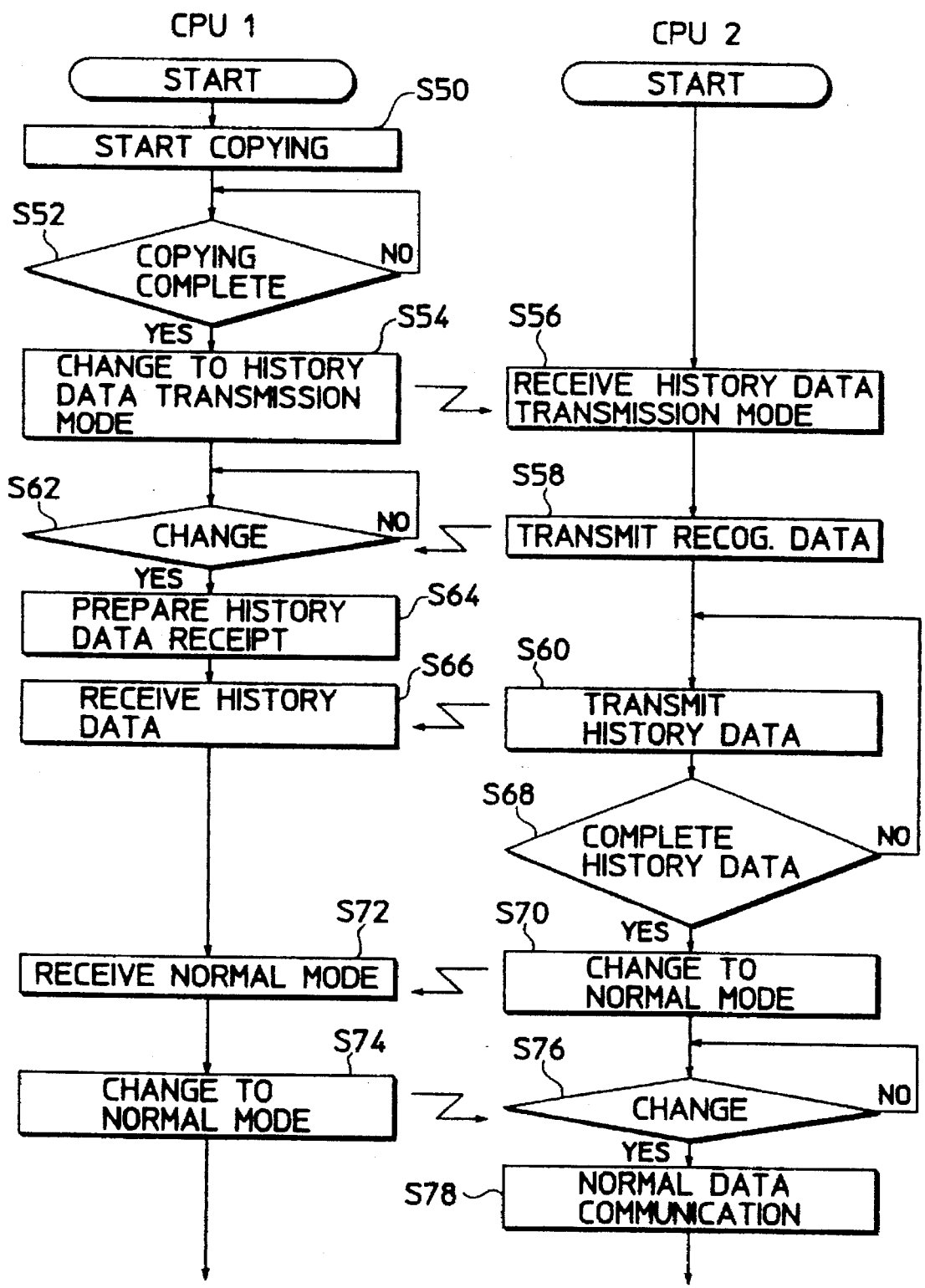
FIG. 7 is a flow chart showing a data communication conducted in a history data transmission mode A.

FIG. 7 is a flow chart showing the data communication conducted in the history data transmission mode A.

When the copy key 401d in the operation panel 4 is operated to designate the start of the copying operation, the CPU 1 transmits to the CPU 2 an information representing the start of the copying operation in the normal communication mode so as to start the copying operation (Step S50). Receiving an information representing the completion of the copying operation from the CPU 2 and judging that the copying operation has been completed (YES in Step S52), the CPU 1 transmits the communication mode data "3" so as to change the communication mode to the history data transmission mode A (Step S54).

Upon the receipt of the communication mode data (Step S56), the CPU 2 changes the communication mode from the normal communication mode to the history data transmission mode A and transmits to the CPU 1 the communication mode data "3" representing the history data transmission mode A as a communication mode recognition data (Step S58). Subsequently, the CPU 2 transmits to the CPU 1 the total development number data, the starting agent replacement number data, the toner empty number data, the upper cassette feed number data, the lower cassette feed number data, the toner count data, and the development aging time data in this order (Step S60).

Upon the receipt of the communication mode recognition data "3" from the CPU 2 (YES in Step S62), the CPU 1 judges that the preparation for the history data transmission mode A has been completed and prepares to receive the history data (Step S64). Subsequently, the CPU 1 receives the transmitted history data one after another (Step S66).

Upon the completion of the transmission of all the history data (YES in Step S68), the CPU 2 transmits the communication mode recognition data "0" to the CPU 1 so as to change the communication mode to the normal communication mode (Step S70).

Receiving the communication mode recognition data "0" following the history data (Step S72), The CPU 1 changes the communication mode to the normal communication and transmits the communication mode data "0" to the CPU 2 (Step S74). Upon the receipt of the communication mode data "0" (YES in Step S76), the CPU 2 judges that the preparation for the normal communication mode has been completed and thereafter the communication is conducted in the normal communication mode (Step S78).

Figure 8A:
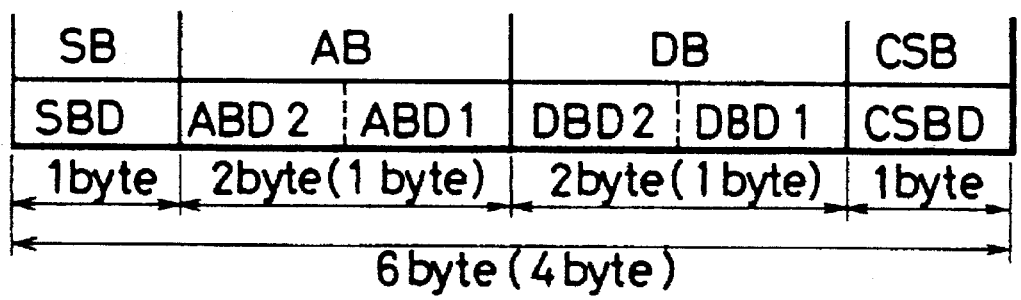
FIGS. 8A, 8B, 8C are diagrams showing a communication protocol in a serial data communication, FIG. 8A showing a construction (frame construction) of data to be transmitted, FIG. 8B a data construction of a head block, and FIG. 8C a construction of a check sum block data.
Figure 8B:
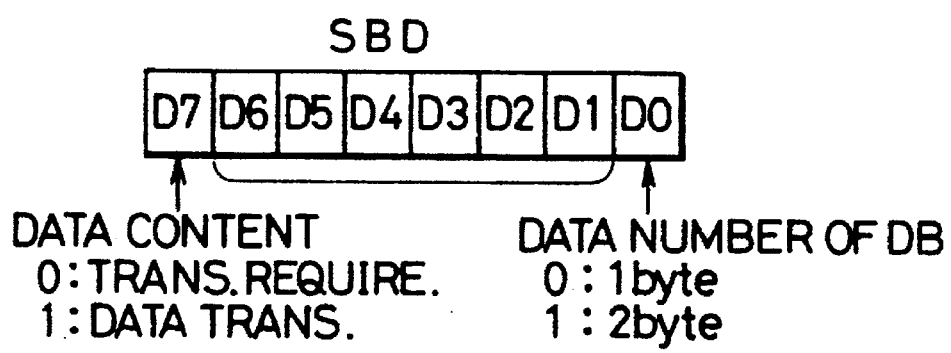
Figure 8C:
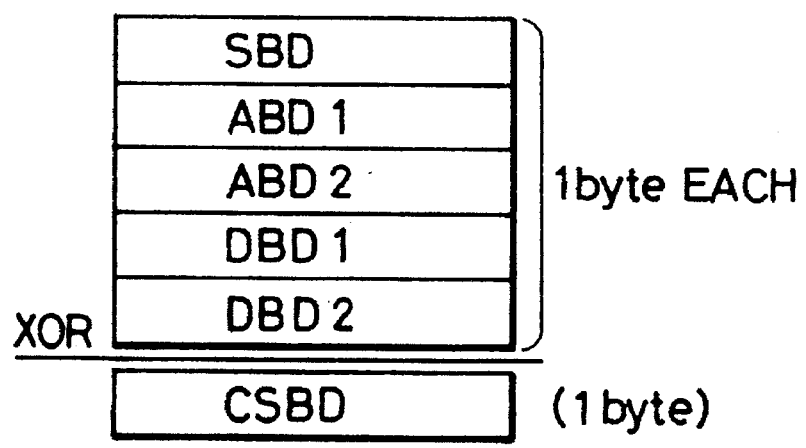

FIGS. 8A, 8B, 8C are diagrams showing a communication protocol in a serial data communication, FIG. 8A showing a construction (frame construction) of a data to be transmitted, FIG. 8B a data construction of a head block, and FIG. 8C a construction of a check sum block data.

The communication data consists of a head block SB representing the head of the communication data, an address block AB representing a storage address for the transmission data, and a data block representing the transmission data, and a check sum block CSB containing an information which is used to check whether an error has occurred during the data communication. The communication data consists of 4 or 6 bytes.

When the communication data consists of 4 bytes, the respective blocks consist of 1 byte each. When the communication data consists of 6 bytes, the head block SB and the check sum block CSB consist of 1 byte each, and the address block AB and the data block DB consist of 2 bytes each.

Since the CPU 1, CPU2 include each a microcomputer of 16 bits, the data in the address block AB and the data block DB consists of 2 bytes each and the communication data transmitted between the operation controller C1 and the drive controller C2 consists of 6 bytes.

The communication data consisting of 4 bytes is transmitted during the data communication with a CPU including a microcomputer of 8 bits. For example, when a controller for controlling the driving of the image reader Q1 is a CPU including a microcomputer of 8 bits, the communication data consisting of 4 bytes is transmitted in the serial data communication between the CPU and the CPU 1 or the CPU 2.

A data SBD constituting the head block SB (hereinafter referred to a head block data SBD) includes the content of the communication data and an information concerning the number of data in the data block DB as shown in FIG. 8B. The information concerning the number of data in the data block DB is expressed in a bit "D0", and the content of the communication data is expressed in a bit "D7". It will be appreciated that the bits "D1" to "D6" are fixedly set at "0".

The bit "D0" is reset to "0" when the data in the data block DB consists of 1 byte, while being set to "1" when it consists of 2 bytes. Since the data transmitted between the CPU 1 and the CPU 2 consists of 2 bytes, the bit "D0" of the head block data SBD is set to "1".

The bit "D7" is reset to "0" when requiring the data transmission to the other end, while being set to "1" when transmitting the data thereto. Accordingly, the construction of the head block data SBb is fixed to the following two types depending upon whether the communication data consists of the data to be transmitted to the other end or the data transmission requirement to the other end.

In requiring the data transmission:

SBD1="00000001B (1H)"

In transmitting the data:

SBD2="10000001B (81H)"

It will be appreciated that "B" and "H" at the end of the data indicate a binary notation and a hexadecimal notation respectively.

The address block AB represents a storage address in the RAM at the end to which the data DBD in the data block DB following the address block AB (hereinafter referred to as a data block data DBD) is transmitted. Let it be assumed that the temperature of the fixing device 24 is controlled based on a data Dt concerning the fixing temperature (hereinafter referred to as a temperature data Dr) set in the address "0578H" in the RAM 37 of the drive controller C2. When the temperature data Dt is transmitted from the CPU 1 to the CPU 2, "0578H" is set in the address block AB of the communication data and the temperature data Dt is set in the following data block DB. More specifically, the data is transmitted to the other end after the storage address for this data is designated at the transmitting end.

The CPU 1 reads the storage address in the RAM 37 of the drive controller C2 corresponding to the temperature data Dt from the receiving end storage address data stored in the ROM 30 in the operation controller C1, and sets this storage address in the address block AB of the communication data.

As shown in FIG. 8C, the data CSBD constituting the check sum block CSB is obtained by taking an exclusive OR (XOR) of the head block data SBD, a lower address block data ABD1, an upper address block data ABD2, a lower data block data DBD1, and an upper data block data DBD2. The lower address block data ABD1 consists of the lower eight digits of a data constituting the address block AB (hereinafter referred to as an address block data ABD). The upper address block data ABD2 consists of the upper eight digits of the data address block ABD. The lower data block data DBD1 consists of the lower eight digits of the data block data DBD. The upper data block data DBD consists of the upper eight digits of the data block data DBD.

At the receiving end of the communication data, a check sum block data CSBD' is generated by taking an (XOR) of the received head block data SBD0 lower address block data ABD1, upper address block data ABD2, lower data block data DBD1, and upper data block data DBD2. The presence or absence of the communication error is judged by checking whether thus generated CSBD' coincides with the received check sum block data CSBD.

Hereafter, the serial data communication in accordance with the communication protocol will be described taking specific examples.

First of all, there is described a case where the data Dt concerning the fixing temperature is transmitted from the CPU 1 to the CPU 2 in the simulation data transmission mode A.

The fixing device 24 is adapted to fix the document image transferred to the copy sheet by bringing the copy sheet in pressing contact with the heating roller 241 whose temperature is held at a predetermined reference temperature Tr. The temperature of the fixing device 24 is controlled by the drive controller C2. When the temperature control for the fixing device 24 is necessary, the drive controller C2 reads the temperature data Dt set in the back-up area of the RAM 37 and sets the same at a specified address in a work area of the internal RAM 40, thereby controlling the temperature of the fixing device 24 based on the temperature data Dt.

The temperature data Dt is expressed, for example, in a hexadecimal number by assigning "80H" to the reference temperature of, e.g., 180° C. and adding or subtracting an amount of change ΔT relative to the reference temperature 180° C. to or from "80H". For example, when the reference temperature Tr is 183° C. or (177° C.), the temperature data Dt is "83H" (or "77H").

The reference temperature Tr is adjusted for each color digital copying machine 1 through the simulation, and its adjustment value (initial data) is stored in specified addresses of the RAMs 31, 37 of the operation and drive controllers C1, C2. When the adjustment value for the reference temperature Tr is corrected thereafter by carrying out the simulation during, for example, a maintenance, the initial temperature data stored in the RAM 31 of the operation controller C1 is rewritten to a temperature data Dt' after the correction (hereinafter referred to as a corrected temperature data Dt') upon the completion of the simulation. Further, this corrected temperature data Dt' is transmitted in the simulation data transmission mode A from the operation controller C1 to the drive controller C2.

Figure 9:
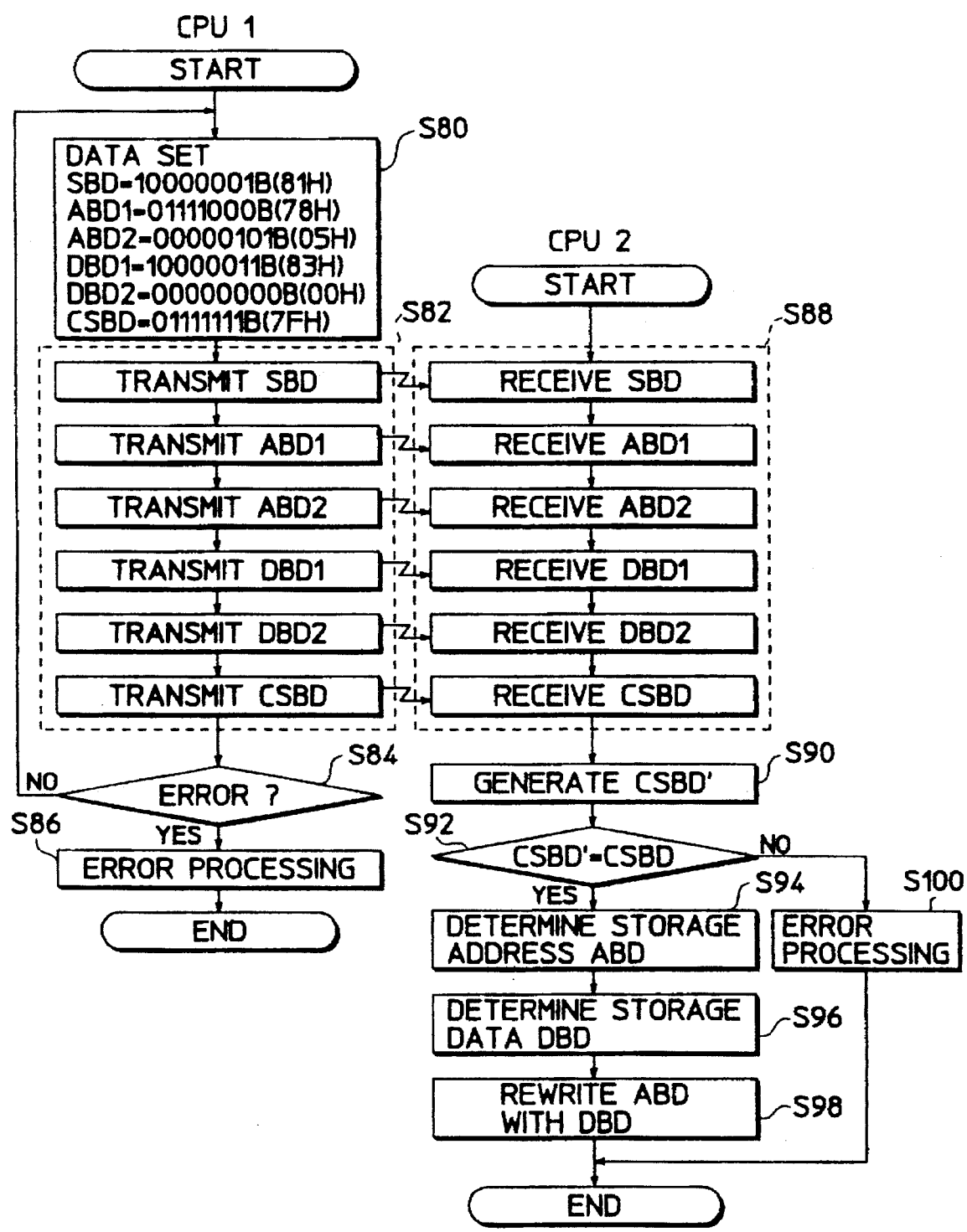
FIG. 9 is a flow chart showing a communication processing of respective CPUs in the serial data communication.

FIG. 9 is a flow chart showing the processings executed by the respective CPUs during the serial data communication.

Figure 10:
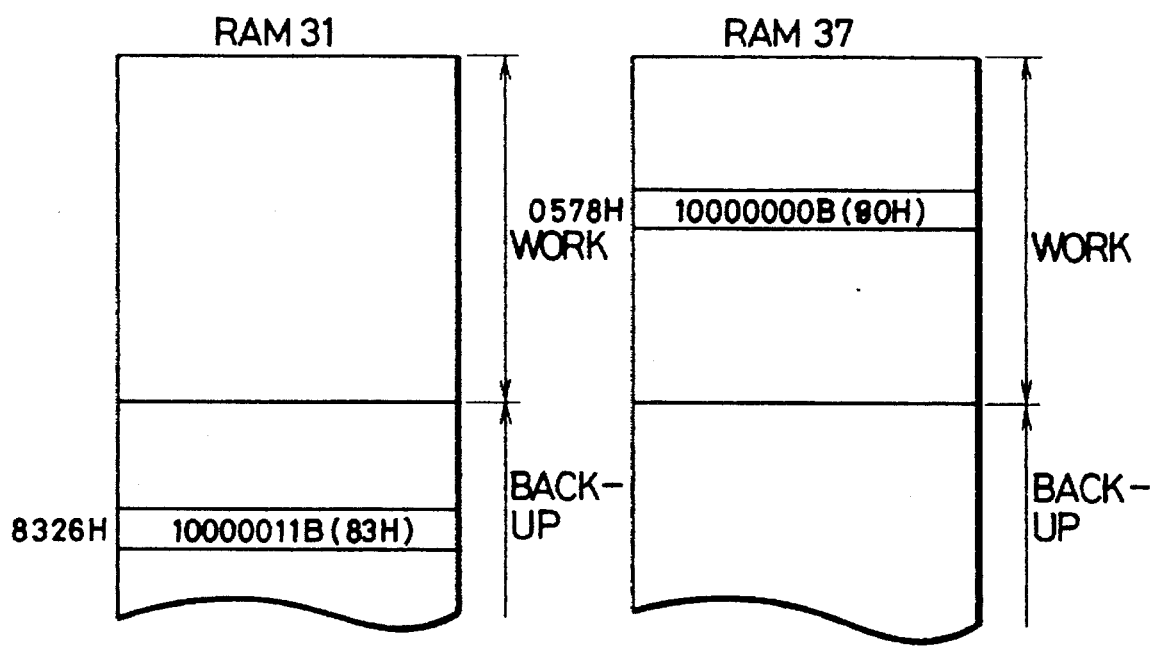
FIGS. 10A, 10B are diagrams showing stored states of data concerning a fixing temperature in respective RAMs of the operation and drive controllers, FIG. 10A showing an address of this data in the RAM of the operation controller and FIG. 10B an address thereof in the RAM of the drive controller.

Let it be assumed that, in transmitting the data from the operation controller C1 to the drive controller C2, the corrected temperature data Dt (=83H) is stored in an address "8326H" of the RAM 31 and the initial temperature data Dt (=80H) is stored in the address "0578H" of the RAM 37 as shown in FIG. 10.

The operation controller C1 generates the head block data SBD. The operation controller C1 also reads the corrected temperature data Dt' (=83H) from the address "8326H" of the RAM 31 and the storage address "0578H" from the receiving end storage address data stored in the ROM 30 and generates the address block data ABD and the data block data (transmission data) DBD.

Further, the operation controller C1 generates the check sum block data CSBD from the head block data SBD, the address block data ABD, and the data block data DBD. The operation controller C1 generates the communication data shown below by combining these data and sets the generated communication data in a transmission buffer in the internal RAM 35 (Step S80).

SBD=10000001B (81H)

ABD1=01111000B (78H)

ABD2=00000101B (05H)

DBD1=10000011B (83H)

DBD2=00000000B (00H)

CSBD=01111101B (7FH)

Subsequently, the operation controller C1 transfers the head block data SBD, the lower address block data ABD1, the upper address block data ABD2, the lower data block data DBD1, the upper data block data DBD2 and the check sum block data CSBD one after another to a transmission register provided in the internal RAM 35, and transmits these data to the CPU 2 through the I/F 34 (Step S82).

Upon the completion of the transmission of the check sum block data CSBD, the operation controller C1 judges whether a transmission error has occurred (Step S84). If no error has occurred (NO in Step S84), this routine returns to Step S80 to transmit the next simulation data. If the transmission error has occurred (YES in Step S84), the communication is terminated after executing a specified error processing (Step S86). The error processing is executed to display messages such as a communication error or a warning requesting an inspection by a service person and to stop the image forming operation.

On the other hand, the CPU 2 receives the transmitted head block data SBD, lower address block data ABD1, upper address block data ABD2, lower data block data DBD1, upper data block data DBD2 and check sum block data CSBD one after another (Step S88). Upon receiving all the data transmitted, the CPU 2 generates the check sum block data CSBD' from the received head block data SBD, lower address block data ABD1, upper address block data ABD2, lower data block data DBD1, and upper data block data DBD2 (Step S90).

Subsequently, the CPU 2 compares the generated check sum block data CSBD' and the received check sum block data CSBD to judge whether a communication error has occurred (Step S92). If CSBD'=CSBD (YES in Step S92), the CPU 2 judges that the communication has been conducted without an error. The CPU 2 determines the storage address in the RAM 37 to "0578H" based on the contents of the received address block data AB51, ABD2 (Step S94) and determines "0083H" as the data to be stored in the address "0578H" based on the contents of the data block data DBD1, DBD2 (Step S98).

The CPU 2 rewrites the content of the address "0578H" of the RAM 37 to the "0083H" (Step S98) and completes the communication processing. On the contrary, if CSBD'≠CSBD (NO in Step S94), the communication processing is terminated after the error processing similar to the one described above is executed (Step S100).

Figure 11:
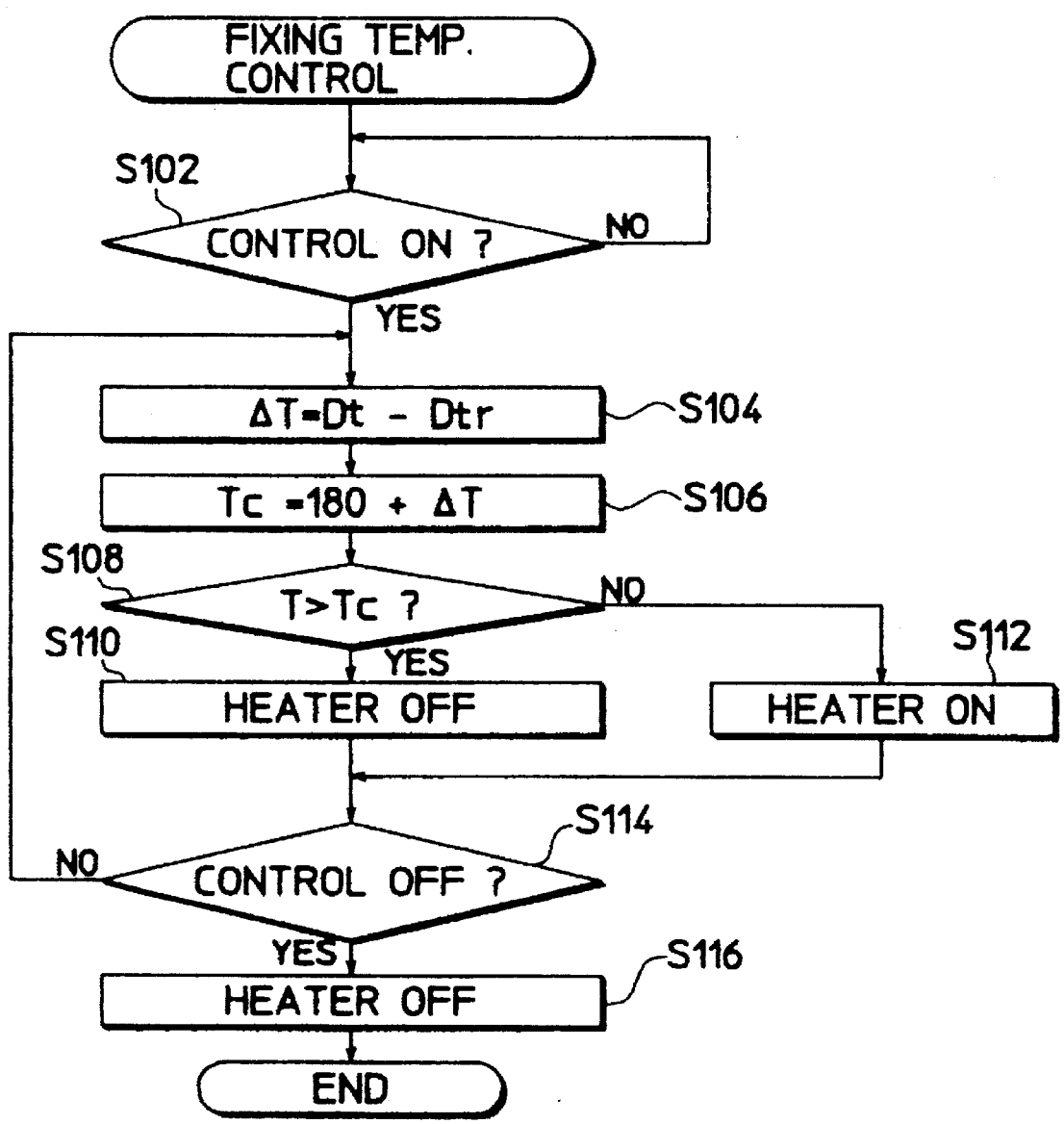
FIG. 11 is a flow chart showing a temperature control of a fixing device.

FIG. 11 is a flow chart showing a temperature control for the fixing device 24.

When the CPU 1 transmits the normal communication data to CPU 2 to designate the temperature control for the fixing device 24 (Step S102), the CPU 2 reads the temperature data Dt from the address "0578H" of the RAM 37 and calculates a difference ΔT (=Dt−Dtr) between the temperature data Dt and a data Dtr (=80H) representing the reference temperature Dr (Step S104). Further, the CPU 2 calculates a temperature control value Tc by adding the above calculation result to the reference temperature 180° C. (Step S106).

It is then judged whether the temperature T of the heating roller 241 detected by the temperature sensor 244 is in excess of the temperature control value Tc (=180+ΔT) in Step S108. If the detected temperature T is in excess of the temperature control value Tc (YES in Step S108), the power application to the fixing heater 243 is stopped (Step S110). If the detected temperature T is not greater than Tc (NO in Step S108), the power application to the heater 243 is started or continued (Step S112).

Subsequently, it is judged whether an instruction has been given to stop the temperature control for the fixing device 24 (Step S114). If no instruction has been given to stop the temperature control, this routine returns to Step S104 to execute the processings of Steps S104 to S112 in order to hold the temperature of the heating roller 241 at (180+Δ)°C. If the instruction has been given to stop the temperature control in Step S114, the power application to the fixing heater 243 is stopped (Step S116), thereby stopping the processing for the temperature control.

Before the simulation data is transmitted, 80H is set in the address "0578H" of the RAM 37 (see FIG. 9). In this case, since ΔT=80H–80H=0° C., the temperature control value Tc=180° C. and the heating roller 241 is controlled to have a temperature of 180° C. However, the content of the address "0578H" of the RAM 37 is rewritten to 83H after the transmission of the simulation data. Then, the temperature control value Tc=180+3=183° C., thus the heating roller 241 is controlled to have a temperature of 183° C.

There will be described next an example in which a data representing the start of the copying operation is transmitted in the normal communication mode.

As described above, the information concerning the control for the copying operation including requirements to start/stop the copying operation and copying conditions are transmitted constantly as flag data such as the control flags A, B and a Copy mode in the normal communication mode from the operation controller C1 to the drive controller C2.

The flag data consists of a state information of each bit constituting a data Dcp concerning the control for the copying operation (hereinafter referred to as a copy control data Dcp). For example, an information concerning the start/stop of the copying operation is expressed by the state of a bit D0 of the copy control data Dcp. The bit D0 set to "1" represents the requirement to start the copying operation, whereas the bit D0 reset to "0" represents the requirement to stop the copying operation.

Figure 12:
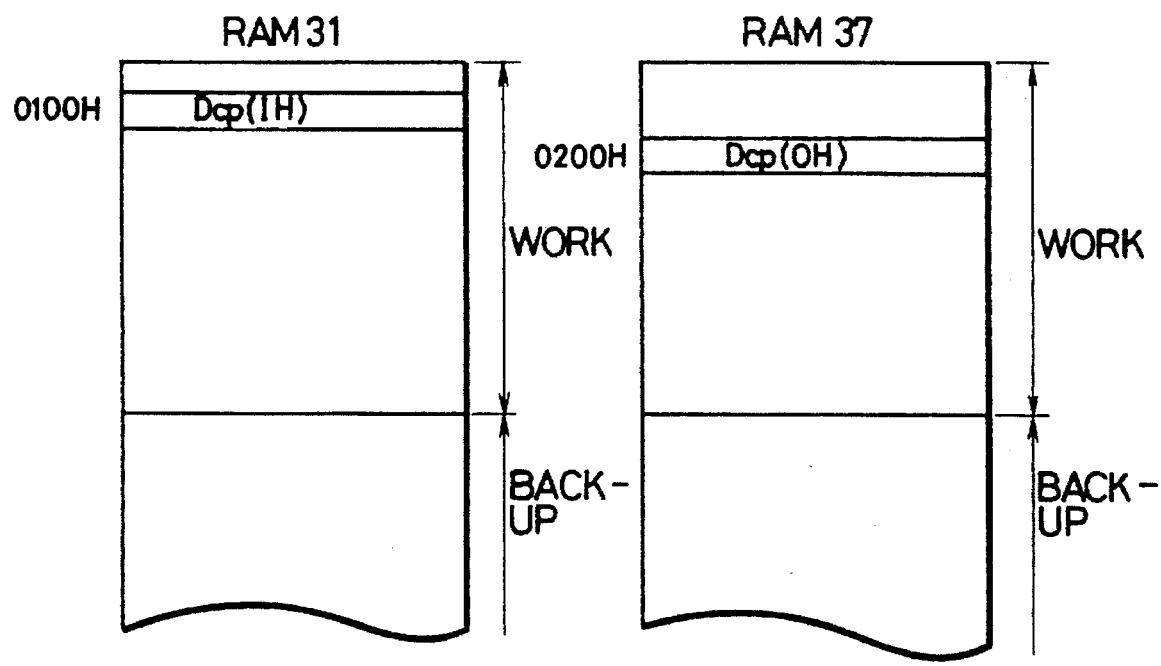
FIGS. 12A, 12B are diagrams showing stored states of data concerning a copying operation in respective RAMs of the operation and drive controllers, FIG. 12A showing an address of this data in the RAM of the operation controller and FIG. 12B an address thereof in the RAM of the drive controller.

The operation controller C1 sets the copy control data Dcp, for example, in an address "0100H" of the RAM 31 as shown in FIG. 12 so as to control or administer the operative state of the color digital copying machine 1. The drive controller C2 sets the copy control data Dcp transmitted from the operation controller C1 in an address "0200H" of the RAM 37 so as to control the actual copying operation.

When the copy key 401d in the operation panel 4 is operated to designate the start of the copying operation, the CPU 1 generates the copy control data Dcp in which the bit D0 is set to "1"; rewrites the content of the address "0100H" of the RAM 31 to the new copy control data Dcp; and transmits the new copy control data Dcp to the CPU 2.

The copy control data Dcp is transmitted in a procedure similar to the one shown in the flow chart of FIG. 9. When the copy key 401d is operated, the CPU 1 generates the following communication data in Step S60 and transmits these data to the CPU 2.

SBD=10000001B (81H)

ABD1=00000000B (00H)

ABD2=00000010B (02H)

DBD1=00000001B (01H)

DBD2=00000000B (00H)

CSBD=10000010B (82H)

It will be appreciated that the flags in the bits of the copy control data Dcp except the bit D0 are all reset to "0".

Receiving the copy control data Dcp without an error, the CPU 2 sets the received data block data DBD (=0001H) in an address of the RAM 37 which is indicated by the address block data ABD (0200H). The CPU 2 monitors constantly the state of the flag in each bit of the copy control data Dcp and controls the copying operation based on the state of each flag. Upon the receipt of the copy control data Dcp, the CPU 2 starts the copying operation, judging based on the flag information, i.e., the flag representing the stop of the copying operation is set to "1," that the copying operation has been requested.

Figure 13:
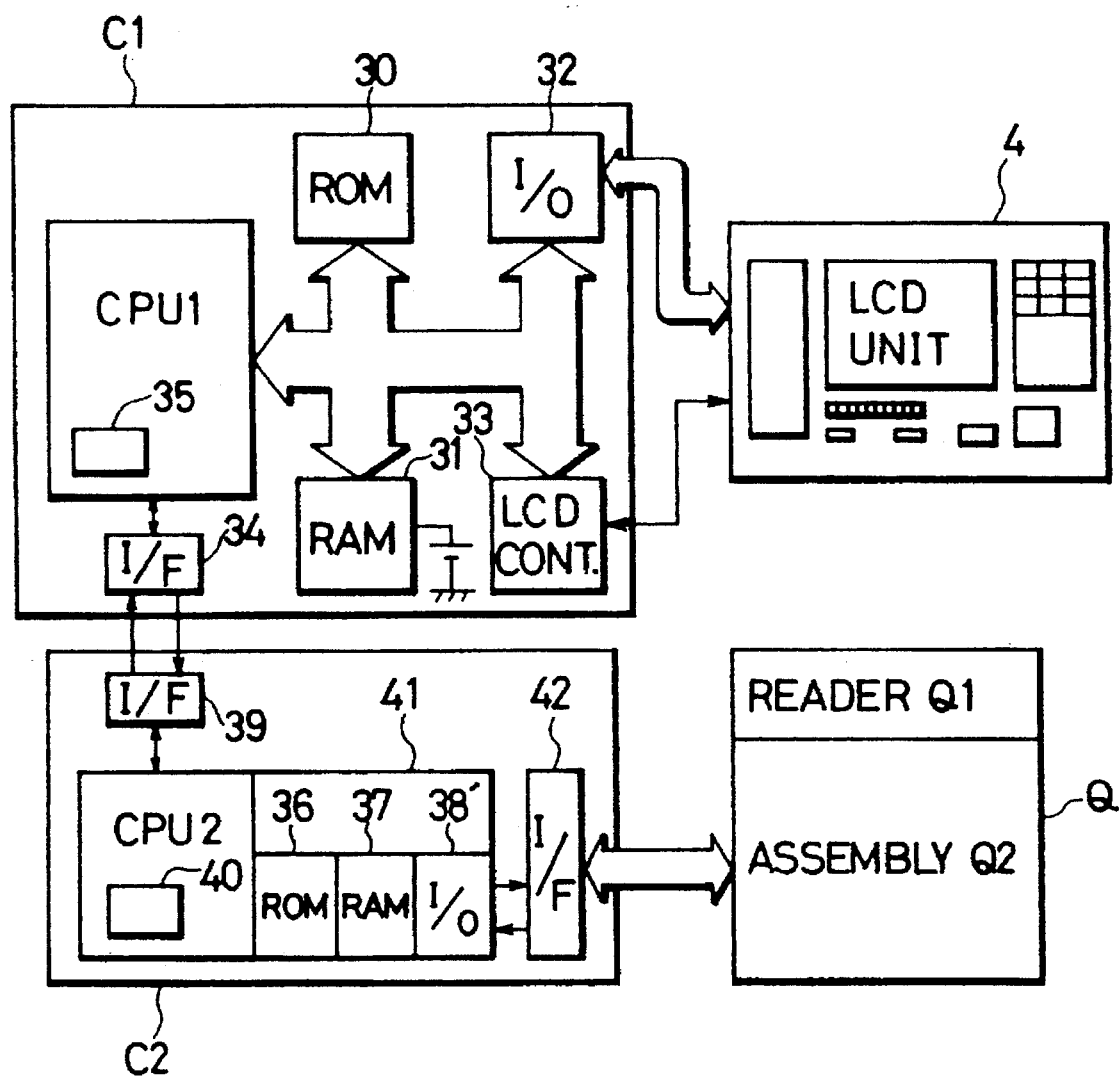
FIG. 13 is a diagram showing a basic construction of an operation controller and a drive controller of a color digital copying machine using another data communication system of the invention.

FIG. 13 is a diagram showing a basic construction of an operation controller C1 and a drive controller C2 of a digital color copying machine 1 as a second embodiment according to the invention.

This figure differs from FIG. 2 in that an I/O port 38' including a memory mapped I/O is provided in place of the I/O port 38 and an I/F 42 is provided for the data communication with an image reader Q1 and an imaging assembly Q2. It will be appreciated that a CPU 2, a ROM 36, a RAM 37, and the I/O port 38' are constituted by a chip of microcomputer.

In the construction shown in FIG. 2, the operation controller C1 transmits to the drive controller C2 only the data necessary to control the drive control block Q, and the drive control block Q is controlled directly by the drive controller C2. Since an output state of the I/O port 38 is also set by the drive controller C2, the driving timings and the driving conditions of the respective actuators connected to the I/O port 38 are controlled by the drive controller C2.

The second embodiment is constructed such that the output state of the I/O port 38' is set by a data corresponding to I/O port 38' (hereinafter referred to as a port data Dp) and that the operation controller C1 is enabled to control directly the actuators connected to the I/O port 38' by transmitting the port data Dp to the drive controller C2. The second embodiment is advantageous in simplifying the construction and the processing of the drive controller C2 since the data and the control programs necessary to control the actuators are stored in the operation controller C1.

There will be described an operation executed by the operation controller C1 to control the actuators connected to the I/O port 38', taking a control of a drive voltage applied to a halogen lamp 501 as an example.

Figure 14:
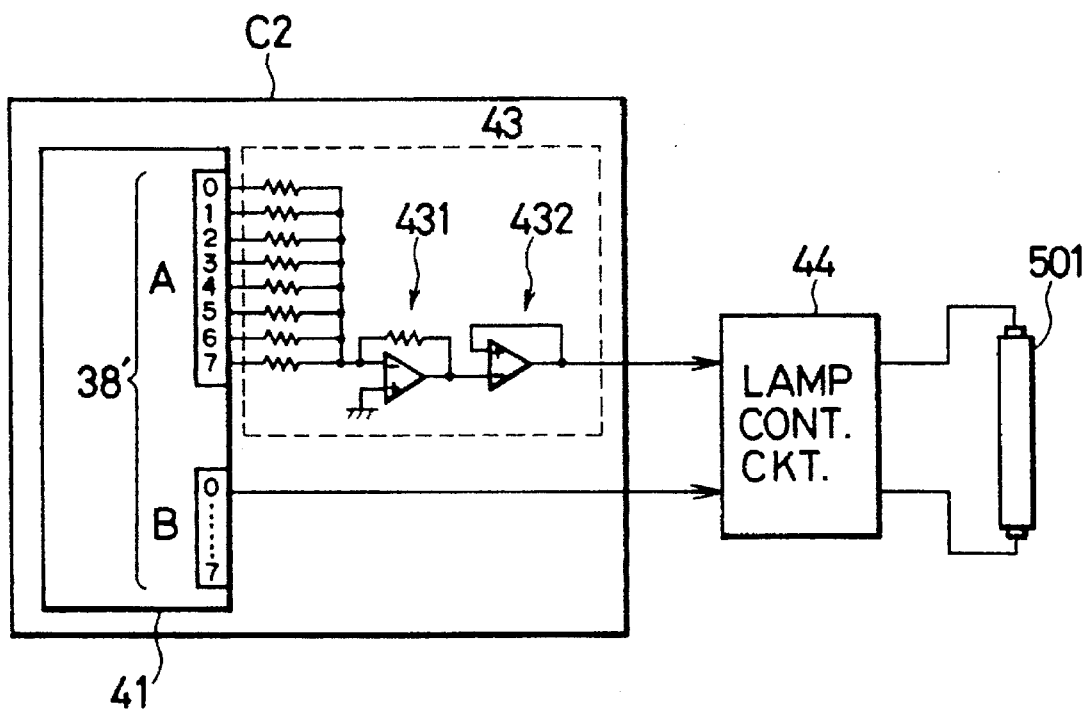
FIG. 14 is a diagram showing a construction of a control circuit for controlling the drive of a lamp.

FIG. 14 is a diagram showing the construction of a control circuit for controlling the drive of the lamp 501.

In this figure, indicated at 41 is a microcomputer including one chip on which the CPU 2, the ROM 36, the RAM 37 and the I/O port 38' are integrated, at 43 a digital-to-analog (D/A) converter, and at 44 a lamp control circuit for controlling the drive of the lamp 501. The D/A converter 43 includes an adder 431 for adding output levels output from the respective bits of a port A of the I/O port 38' and an amplifier 432 for amplifying an output of the adder 431. The D/A converter 432 converts a digital signal output from the port A into an analog signal.

The I/O port 38' includes output ports A, B, each having eight ports. A data Dv representing a drive voltage of the lamp 501 (hereinafter referred to as a voltage data Dv) is output from the output port A. From the respective ports of the output port B are output the following remote control signals:

Port 0: turn-on control for the lamp 501

Port 1: drive control for a main motor

Port 2: drive control for the image reader Q1

Port 3: drive control for feed rollers 12, 13

Port 4: drive control for a pair of registration rollers 20

Port 5: drive control for a main charger 902

Port 6: drive control for a transfer device 907

Port 7: power application control for a fixing heater 243

Figure 15:
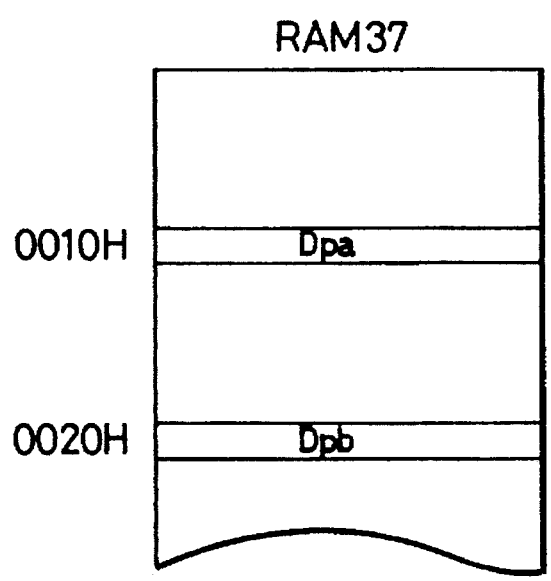
FIG. 15 is a diagram showing exemplary addresses of I/O port data corresponding to a memory mapped I/O.

The port data Dpa, Dpb corresponding to the output ports A, B are set in addresses "0010H", "0020H" of a work area in the RAM 37, for example, as shown in FIG. 15. The voltage data Dv corresponds to the port data Dpa set in the address "0010H" and the data output from the respective ports of the output port B corresponds to the port data Dpb set in the address "0020H". Accordingly, the remote control signal for the lamp 501 corresponds to the data in the bit D0 of the port data Dpb.

The voltage data Dv output from the output port A is converted into an analog signal by the D/A converter 43 and output as an actual drive voltage V to the lamp control circuit 44. The data corresponding to the respective remote control signals are flag data used to control the driving of the aforementioned actuators (hereinafter referred to as a flag FR). The flag FR reset to "0" indicates the start of the drive control, whereas the flag FR set to "1" indicates the stop of the drive control.

For example, when the flag FR is reset to "0," the lamp control circuit 44 applies the drive voltage V sent from the D/A converter 43 to the lamp 501, thereby turning the lamp 501 on. When the flag FR is set to "1," the lamp control circuit 44 turns the lamp 501 off.

The flag FR is set at a suitable timing when the drive controller C2 executes an image reading operation in accordance with a control program for the image reader Q1.

Figure 16:
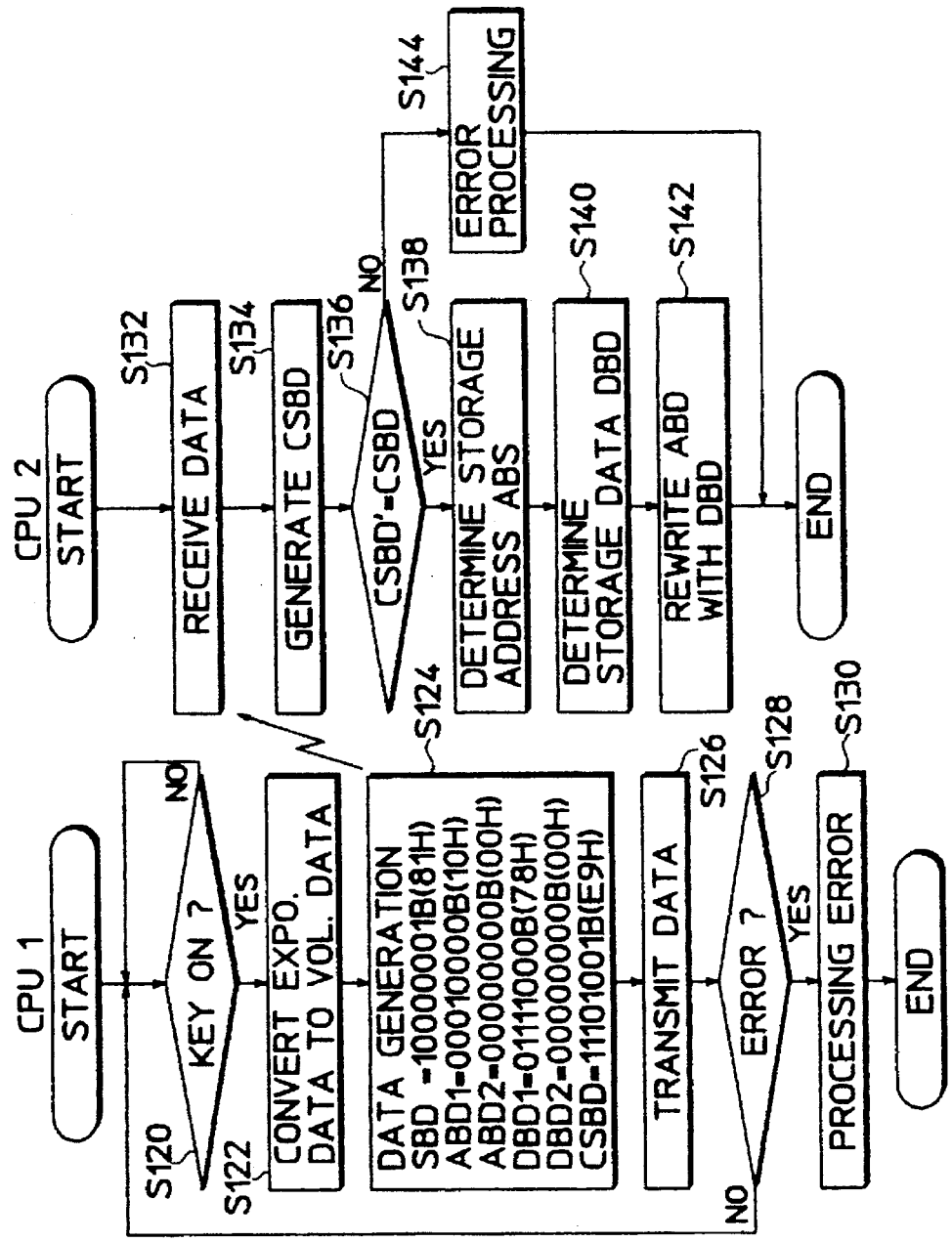
FIG. 16 is a flow chart showing a control the operation controller executes based on an exposure level to control a drive voltage for the lamp.
Figure 17:
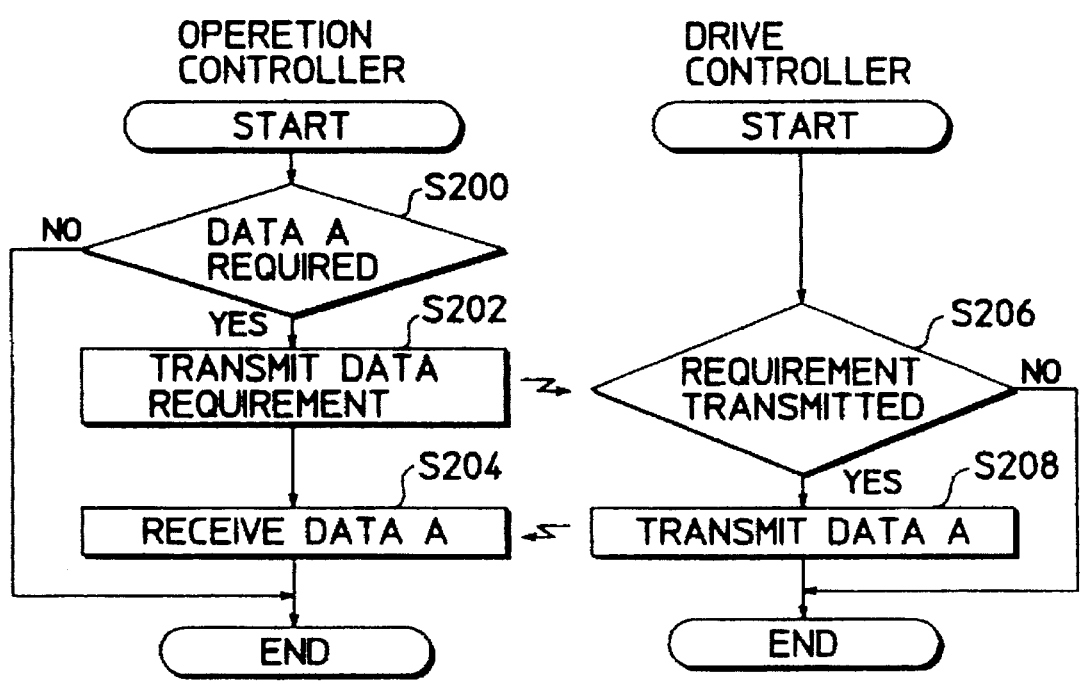
FIG. 17 is a flow chart showing a serial data communication conducted in a conventional handshaking manner.
Figure 18:
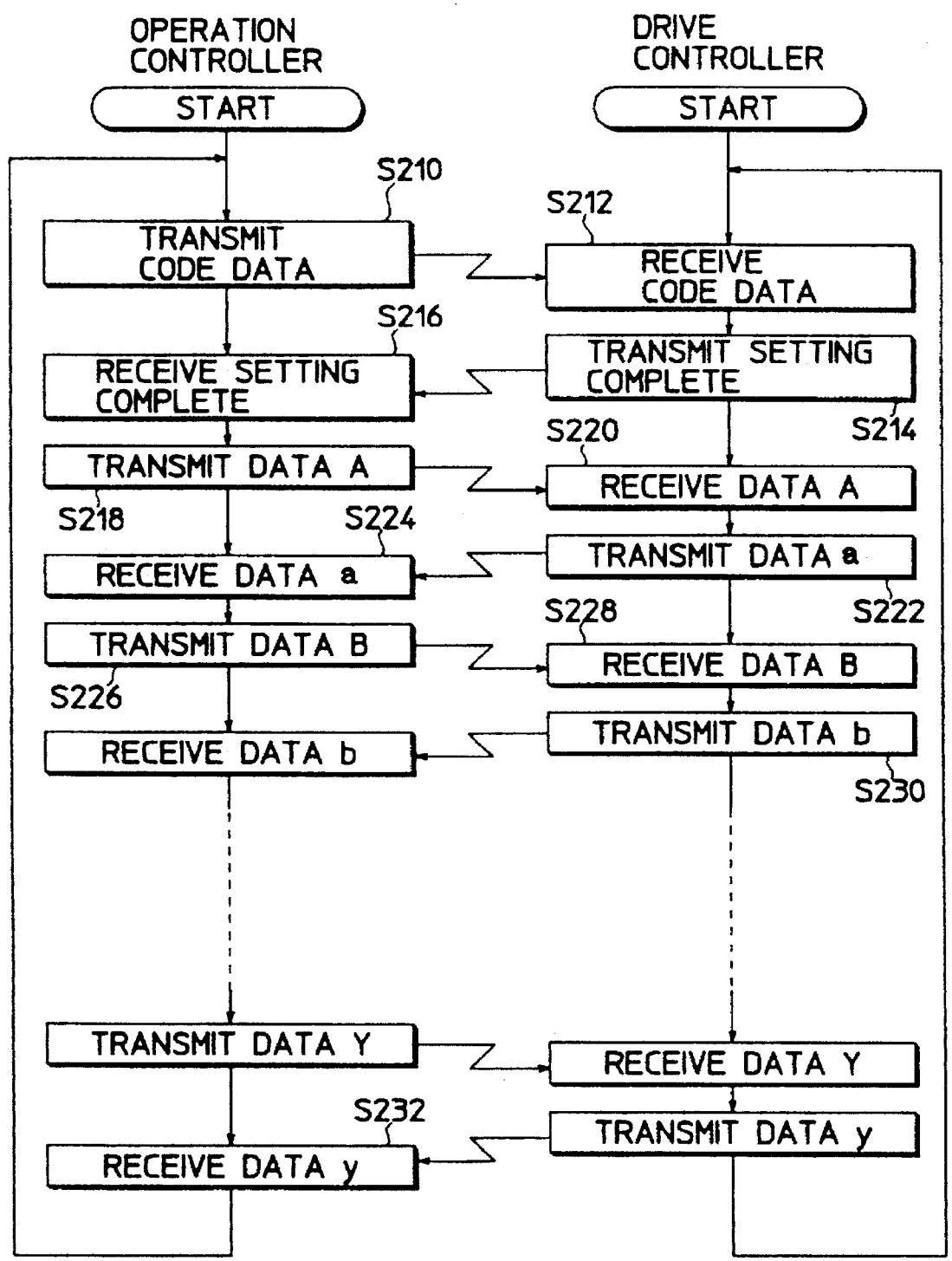
FIG. 18 is a flow chart showing a serial data communication conducted in another conventional handshaking manner.

FIG. 16 is a flow chart showing the drive voltage control for the lamp 501 by the operation controller C1 based on an exposure level.

The exposure level of the image reader Q1 is manually settable in 13 stages, namely, levels 0 to 12, by operating an exposure key 401b. When the color digital copying machine 1 is powered on, the exposure level is normally initially set at an intermediate level 6.

The CPU sets a data De representing the exposure level (hereinafter referred to as an exposure data De) in a specified address of the internal RAM 35, converts the exposure data De into the voltage data Dv for the lamp 501, and transmits the voltage data Dv to the CPU 2 in the normal communication mode. Upon the receipt of the voltage data Dv, the CPU 2 rewrites the content in the address "0010H" of the RAM 37 to the received voltage data Dv.

The voltage data Dv is transmitted constantly from the CPU 1 to the CPU 2 in the normal communication mode. When the voltage data Dv is changed through a manual operation, the new voltage data Dv is transmitted immediately to the CPU 2 and the content in the address "0010H" of the RAM 37 is rewritten to this new voltage data Dv.

More specifically, when the exposure level is changed by operating the exposure key 401b (Step S120), the CPU 1 rewrites the content in the specified address of the internal RAM 35 where the exposure data De is set to the new exposure data De and converts this new exposure data De into a voltage data Dv (Step S122). This conversion is made through the calculation in accordance with a predetermined operation expression or using a preset conversion table.

Subsequently, the CPU 1 assigns the calculated voltage data Dv as a data block data DBD; reads the storage address "0010H" for the voltage data Dv from the receiving end storage address data stored in the ROM 30 and generates the address block data ABD; and generates a specified communication data from the data block data DBD and the address block data ABD (Step S124).

Let it be assumed that the exposure data De after the change is "8" and the exposure data De (=8) is converted into the voltage data Dv (=78H). Then, when the exposure data De is set to 8 by operating the exposure key 401b, a communication data including the following data is generated:

SBD=10000001B (81H)

ABD1=00010000B (10H)

ABD2=00000000B (00H)

DBD1=01111000B (78H)

DBD2=00000000B (00H)

CSBD=11101001B (E9H)

Subsequently, the operation controller C1 transfers the head block data SBD, the lower address block data ABD1, the upper address block data ABD2, the lower data block data DBD1, the upper data block data DBD2 and the check sum block data CSBD one after another to the transmission register in the internal RAM 35, and then transmits these data to the CPU 2 through the I/F 34 (Step S126).

Upon the completion of the transmission of the check sum block data CSBD, the CPU 1 judges whether any error has occurred during the data transmission (Step S128). If no transmission error has occurred (NO in Step S128), this routine returns to Step S120 to transmit the next communication data. If the transmission error has occurred (YES in Step S128), the communication is terminated after the aforementioned error processing is executed (Step S130).

The CPU 2 receives the transmitted head block data SBD, lower address block data ABD1, upper address block data ABD2, lower data block data DBD1, upper data block data DBD2 and check sum block data CSBD one after another (Step S132). Upon receiving all the data transmitted, the CPU 2 generates the check sum block data CSBD' from the received head block data SBD, lower address block data ABD1, upper address block data ABD2, lower data block data DBD1, and upper data block data DBD2 (Step S134).

Subsequently, the CPU 2 compares the generated check sum block data CSBD' and the received check sum block data CSBD to judge whether a communication error has occurred (Step S136). If CSBD'=CSBD (YES in Step S136), the CPU 2 judges that the communication has been conducted without an error. The CPU 2 determines the storage address in the RAM 37 to "0010H" based on the contents of the received address block data ABD1, ABD2 (Step S138) and determines "0078H" as the data to be stored in the address "0010H" based on the contents of the data block data DBD1, DBD2 (Step S140).

The CPU 2 rewrites the content of the address "0010H" of the RAM 37 to the "0078H" (Step S142) and finishes the communication processing. On the contrary, if CSBD'≠CSBD (NO in Step S136), the communication processing is terminated after the error processing similar to the one described above is executed (Step S144).

When the content of the address "0010H" of the RAM 37 is rewritten to "0078H", the drive voltage for the lamp 501 which is input from the drive controller C2 to the lamp control circuit 44 is changed to a specified drive voltage V obtained by D/A converting the voltage data Dv (=78H). Thereafter, the drive controller C2 sends a remote control signal of low level to the lamp control circuit 44 so as to read the image of the document G. Upon the receipt of this signal, the circuit 44 applies the drive voltage V to the lamp 501.

As described above, the drive voltage V for the lamp 501 which is input to the lamp control circuit 44 is controlled directly by the voltage data Dv transmitted from the CPU 1. Accordingly, it is not necessary for the CPU 2 to execute the drive voltage control including the conversion of the exposure data De into the voltage data Dv and the input of the voltage data Dv to the lamp control circuit 44. This simplifies the processing of the CPU 2.

The conversion processing is normally specified beforehand such that the exposure data De (=8) is converted into the voltage data Dv (=78H). However, the imaging conditions of the overall color digital copying machine 1 may change over the time due to a long operation time, a great number of copying operations, and the like, thereby necessitating the conversion processing different from the properly specified one. e.g., the conversion processing in which the exposure data De (=8) is converted into a voltage data Dv (=80H).

The above case normally requires an inspection or maintenance of the entire color digital copying machine 1. However, a desired conversion processing is enabled simply without changing the content of the conversion table or operation expression stored in the ROM 30 by, while keeping the presently set exposure level at "8", transmitting the voltage data Dv of "80H" from the CPU 1 to the CPU 2 in the communication mode other than the normal communication mode and rewriting the content of the address "0010H" of the RAM 37 from "78H" to "80H". In this way, the color digital copying machine 1 is enabled to drive provisionally.

The above processing can be executed similarly in the case where the CPU 2 converts the exposure data De transmitted from the CPU 1 in the normal communication mode into the voltage data Dv and rewrites the content of the address "0010H" of the RAM 37 to the voltage data Dv.

Similarly, the turn-on timing of the lamp 501 can be changed to the one different from the properly specified timing by transmitting the port data Dpb from the operation controller C1 to the drive controller C2.

This processing will be described taking as an example a case where the lamp 501, which is turned on 1000 ms after the turn-on timing of the registration switch provided immediately downstream from the registration roller pair 20 in the proper specification, is turned on at the same time of the turn-on timing of the registration switch.

Let it be assumed that a detection signal from the registration switch is transmitted from the drive controller C2 to the operation controller C1 and that the operation controller C1 is capable of confirming the on/off-state of the registration switch. Let it be further assumed that the drive controller C2 controls the turn-on of the lamp 501 by executing a specified control program and rewriting suitably the port data Dpb in the address "0020" of the RAM 37.

If the turn-on timing of the lamp 501 needs to be changed, the control program for the operation controller C1 is changed to execute the following processing when the CPU 1 detects that the registration switch has been turned on.

Upon detecting that the registration switch has been turned on, the CPU 1 confirms the state of the port B of the I/O port 38' based on the port data Dpb transmitted from the CPU 2 to the CPU 1 in the normal communication mode; generates a port data Dpb' by resetting only the bit D0 of the port data Dpb to "0"; and transmits the generated data to the CPU 2.

For example, if the port data Dpb is "11110101B" and the main motor and feed rollers are in operation, the CPU 1 generates the port data Dpb' "11110100B" by resetting only the bit D0 of the port data Dpb to "0" so as to turn the lamp 501 on without changing the other states and transmits the same to the CPU 2.

Upon the receipt of the port data Dpb' from the CPU 1, the CPU 2 rewrites the content in an address "0020H" of the RAM 37 to the port data Dpb'. This causes only the port 0 of the port B to invert from high level to low level. Thus, the lamp 501 is turned on substantially at the same time when the registration switch is turned on without changing the operating states of the main motor and feed roller.

In the foregoing embodiments, the invention is applied to the color digital copying machine. However, the invention is not limited to this, but is also applicable to a facsimile, printer, or like image forming apparatus.

Further, the application of the invention is not limited to the image forming apparatuses. The invention is also applicable to any data communication system constructed such that a plurality of independent control blocks are connected to enable a data communication with one another and the respective control blocks are systematically united by transmitting data to one another, thereby performing a composite function operation. For example, the invention is applicable to a special OA (office automation) system or a data communication system used for a variety of apparatuses such as manufacturing, processing, and testing apparatuses.

As described above, according to the invention, a data communication system is provided with a plurality of controllers for controlling a plurality of independent function operations, the controllers being so connected as to enable a data communication with one another to perform a composite function operation by uniting systematically the plurality of independent function operations, and a plurality of data storages provided in correspondence with the respective controllers to store data necessary to execute controls of the respective controllers. At least one controller transmits a communication data including a data to be transmitted and an address data representing an address in the data storage at the receiving end in which the transmission data is stored, and the controller at the receiving end writes the received transmission data in the address of its data storage represented by the address data included in the communication data. Accordingly, the controller at the transmitting end is allowed to freely control the data necessary for the control executed by the controller at the receiving end. Even in the event where the transmission data needs to be changed or added or the content of the communication needs to be changed, a desired data can be transmitted easily to the controller of the receiving end without changing a basic program for controlling the data communication.

The controller of at least one receiving end is provided with an I/O port for inputting and outputting the data, and a device for setting the states of respective ports of the I/O port in correspondence with the respective bit information of the output data stored in a specified address of the data storage of this controller. Accordingly, the controller of the transmitting end is allowed to directly control actuators connected to the I/O port by transmitting the output data to the receiving end so as to change the content of the output data stored in the data storage at the receiving end. Since the controller of the transmitting end controls the actuators, the construction and processing of the controller of the receiving end can be simplified.

A communication manner between the controllers is such that at least one controller transmits a communication data including a transmission data and an address data representing an address in the data storage at the receiving end in which the transmission data is stored, and the controller at the receiving end writes the received transmission data in the address of its data storage represented by the address data included in the communication data. Accordingly, the controller of the transmitting end is allowed to control freely the content of the data storage of the receiving end. Even if the controller of the receiving end is required to execute a special control different from the one specified by a basic control program, such a special control can be executed easily without changing the basic control program for the controller of the receiving end by transmitting a suitable data from the controller of the transmitting end and rewriting the corresponding data stored in the data storage of the receiving end with this transmitted data.

Further, according to the invention, a data communication manner for a data communication system including a plurality of controllers for controlling a plurality of independent function operations, the controllers being so connected as to enable a data communication with one another to perform a composite function operation by uniting systematically the plurality of independent function operations, includes a first communication mode in which a first group of predetermined data are transmitted continuously repeatedly and a second communication mode in which a second group of predetermined data are transmitted when at least one of specified communication conditions is satisfied. A group of data which need to be transmitted constantly are transmitted in the first communication mode, whereas a group of data which need not to be transmitted constantly are transmitted in the second communication mode. This prevents an amount of data to be transmitted from increasing unnecessarily, thereby improving the efficiency of the data communication and further improving the efficiency of the overall control operation of the data communication system.

In the second communication mode, when a predetermined period elapses or a preset processing is completed, a specified data or a data obtained by this processing is transmitted. Thus, a necessary data can be transmitted when required and the efficiency of the processing of each controller will improve further.

Although the present invention has been fully described by way of example with reference to the accompanying drawings, it is to be understood that various changes and modifications will be apparent to those skilled in the art. Therefore, unless otherwise such change and modifications depart from the scope of the invention, they should be construed as being included therein.

What is claimed is:

1. A data communication system for communicating data between a first control unit for controlling a first operation and a second control unit for controlling a second operation, the first and second control units being provided in an image forming apparatus, the first control unit having a first memory for storing a first operative data necessary to execute its own control independently of the second control unit, the second control unit having a second memory for storing a second operative data necessary to execute its own control independently of the first control unit, the data communication system comprising:

address data means provided in the first control unit for storing address data for each of the items constituting the second operative data stored in the second memory;

item data generating means provided in the first control unit for generating new data for a selected item of the second operative data;

transmission data generating means connected with the address data means and the item data generating means for combining the new item data and the address data corresponding to the selected item to generate transmission data;

data transmitting means connected with the transmission data generating means for transmitting the transmission data to the second control unit;

data receiving means provided in the second control unit for receiving the transmission data;

writing means connected with the data receiving means for writing the new item data on the second memory at the address specified in the transmission data;

the second control unit being further provided with input and output port means having an output bit selectively driven by a bit of one of said new item data at a specified address of the second memory and in direct connection with a specified one of a plurality of actuators for executing the second operation;

the first control unit being adapted for controlling an input and output operation of information necessary for image forming, the second control unit being adapted for controlling an operation of reading a document image and forming an image on a copy item.

2. A data communication system as defined in claim 1 further comprising:

check sum data generating means provided in the first control unit for generating check sum data for checking occurrence of an error in the transmission, the check sum data being an exclusive OR result of the new item data and the address data;

wherein the transmission data generating means combines the new item data, the address data, and the check sum data to generate transmission data.

3. A data communication system as defined in claim 1 wherein:

the second control unit is further provided with:

address data means for storing address data for each of the items constituting the first operative data stored in the first memory;

item data generating means for generating new data for a selected item of the first operative data;

transmission data generating means for combining the new item data and the address data corresponding to the selected item to generate transmission data; and data transmitting means for transmitting the transmission data to the first control unit; and the first control unit is further provided with:

data receiving means for receiving the transmission data; and writing means for writing the new item data on the first memory at the address specified in the transmission data.

4. A data communication system as defined in claim 3 further comprising:

check sum data generating means provided in the second control unit for generating check sum data for checking occurrence of an error in the transmission, the check sum data being an exclusive OR result of the new item data and the address data generated in the second control unit;

wherein the transmission data generating means provided in the second control unit combines the new item data, the address data, and the check sum data to generate transmission data to the first control unit.

* * * * *